(12) United States Patent
Uhrenholt

(10) Patent No.: US 12,306,764 B2
(45) Date of Patent: May 20, 2025

(54) CACHE SYSTEMS WITH AGE-BASED EVICTION

(71) Applicant: Arm Limited, Cambridge (GB)

(72) Inventor: Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 48 days.

(21) Appl. No.: 18/446,535

(22) Filed: Aug. 9, 2023

(65) Prior Publication Data

US 2024/0078186 A1    Mar. 7, 2024

(30) Foreign Application Priority Data

Sep. 1, 2022  (GB) ..................... 2212738

(51) Int. Cl.
 *G06F 12/0891*    (2016.01)
(52) U.S. Cl.
 CPC .... *G06F 12/0891* (2013.01); *G06F 2212/604* (2013.01)
(58) Field of Classification Search
 CPC ................ G06F 12/0891; G06F 2212/604
 IPC ................... G06F 12/0891,2212/604
 See application file for complete search history.

(56) References Cited

U.S. PATENT DOCUMENTS

| | | | |
|---|---|---|---|
| 9,189,402 B1 | 11/2015 | Smaldone et al. | |
| 10,802,967 B1 | 10/2020 | Ray et al. | |
| 11,061,594 B1 | 7/2021 | Wang et al. | |
| 2003/0217081 A1 | 11/2003 | White et al. | |
| 2004/0030833 A1 | 2/2004 | Arimilli et al. | |
| 2006/0090036 A1 | 4/2006 | Zohar et al. | |
| 2007/0104212 A1 | 5/2007 | Gutman | |
| 2015/0221063 A1 | 8/2015 | Kim et al. | |
| 2015/0379684 A1 | 12/2015 | Ramani et al. | |
| 2016/0154739 A1 | 6/2016 | Jung et al. | |
| 2016/0283416 A1 | 9/2016 | Ha et al. | |
| 2017/0199820 A1* | 7/2017 | Romanovskiy | G06F 3/0673 |
| 2017/0256025 A1 | 9/2017 | Abraham et al. | |
| 2017/0277805 A1 | 9/2017 | Li et al. | |
| 2017/0371793 A1 | 12/2017 | Saidi et al. | |
| 2018/0181491 A1 | 6/2018 | DeLaurier et al. | |
| 2019/0155731 A1 | 5/2019 | Hagersten et al. | |
| 2019/0251029 A1 | 8/2019 | Steinmacher-Burow | |
| 2019/0303576 A1 | 10/2019 | Masputra et al. | |
| 2020/0159664 A1 | 5/2020 | Lai et al. | |
| 2020/0210343 A1 | 7/2020 | Tomei et al. | |

(Continued)

FOREIGN PATENT DOCUMENTS

| | | |
|---|---|---|
| EP | 3385848 | 10/2018 |
| EP | 3486784 A1 | 5/2019 |

(Continued)

OTHER PUBLICATIONS

Non-Final Office Action dated Mar. 28, 2024, U.S. Appl. No. 18/064,020, 50 pages.

(Continued)

*Primary Examiner* — Jane W Benner
(74) *Attorney, Agent, or Firm* — Pearl Cohen Zedek Latzer Baratz LLP

(57) ABSTRACT

A method of operating a cache system is disclosed. When it is desired to evict a cache entry from the cache, a cache entry to evict from the cache is selected using an age of any compression block that the cache is caching data for, and the selected cache entry is evicted from the cache.

13 Claims, 15 Drawing Sheets

(56) References Cited

U.S. PATENT DOCUMENTS

| | | |
|---|---|---|
| 2020/0394458 A1 | 12/2020 | Yu et al. |
| 2021/0011646 A1 | 1/2021 | Nystad et al. |
| 2021/0191869 A1 | 6/2021 | SeyedzadehDelcheh et al. |
| 2021/0191872 A1* | 6/2021 | Appu .................. G06F 12/0855 |
| 2021/0216455 A1 | 7/2021 | Uhrenholt et al. |
| 2021/0216464 A1 | 7/2021 | Uhrenholt et al. |
| 2021/0224189 A1 | 7/2021 | Liu et al. |
| 2022/0027283 A1 | 1/2022 | Uhrenholt et al. |
| 2022/0091991 A1 | 3/2022 | Bhargava et al. |
| 2022/0141542 A1 | 5/2022 | Stevens et al. |

FOREIGN PATENT DOCUMENTS

| | | |
|---|---|---|
| GB | 2583020 A | 10/2020 |
| WO | 2020190813 A1 | 9/2020 |

OTHER PUBLICATIONS

Non-Final Office Action dated Apr. 24, 2024, U.S. Appl. No. 18/067,180, 52 pages.

Response to Non-Final Office Action dated Apr. 26, 2024, U.S. Appl. No. 18/064,044, 8 pages.

Examination Report dated Apr. 30, 2024, GB Patent Application No. GB2118624.2, 3 pages.

Response to Non-Final Office Action dated Jun. 26, 2024, U.S. Appl. No. 18/064,020, 11 pages.

Notice of Allowance dated Jul. 8, 2024, U.S. Appl. No. 18/064,044, 19 pages.

Response to Non-Final Office Action dated Jul. 18, 2024, U.S. Appl. No. 18/067,180, 7 pages.

Combined Search and Examination Report under Sections 17 and 18(3), dated May 3, 2023, Application No. GB2212738.5.

Uhrenholt et al., U.S. Appl. No. 18/064,020, filed Dec. 9, 2022.

Combined Search and Examination Report dated Jul. 19, 2022, GB Patent Application No. GB2118624.2.

Combined Search and Examination Report dated Aug. 2, 2022, GB Patent Application No. GB2118626.7.

Combined Search and Examination Report dated Aug. 2, 2022, GB Patent Application No. 2118631.7.

Seiler, Larry et al., "Automatic GPU Data Compression and Address Swizzling for CPUs via Modified Virtual Address Translation", Symposium on Interactive 3D Graphics and Games, 2020, pp. 1-10.

Alameldeen Alaa R. et al., "Adaptive Cache Compression for High-Performance Processors", ACM Sigarch Computer Architecture News, vol. 32, Issue 32, Mar. 2004.

Park, Jaehyun et al., "HoPE: Hot-Cacheline Prediction for Dynamic Early Decompression in Compressed LLCs", ACM Transactions on Design Automation of Electronic Systems, vol. 22, Issue 3, Jul. 2017, pp. 1-25.

Uhrenholt "Cache Systems," U.S. Appl. No. 18/064,044, filed Dec. 9, 2022.

Uhrenholt et al., "Cache Systems," U.S. Appl. No. 18/067,180, filed Dec. 16, 2022.

Non-Final Office Action dated Feb. 14, 2024, U.S. Appl. No. 18/064,044, 24 pages.

Final Office Action dated Oct. 23, 2024, U.S. Appl. No. 18/067,180, 24 pages.

Final Office Action dated Nov. 4, 2024, U.S. Appl. No. 18/064,020, 43 pages.

Response to Final Office Action dated Dec. 31, 2024, U.S. Appl. No. 18/067,180, 7 pages.

Response to Final Office Action dated Jan. 31, 2025, U.S. Appl. No. 18/064,020, 11 pages.

Non-Final Office Action dated Feb. 21, 2025, U.S. Appl. No. 18/067,180, 19 pages.

Notice of Allowance dated Feb. 26, 2025, U.S. Appl. No. 18/064,020, 19 pages.

\* cited by examiner

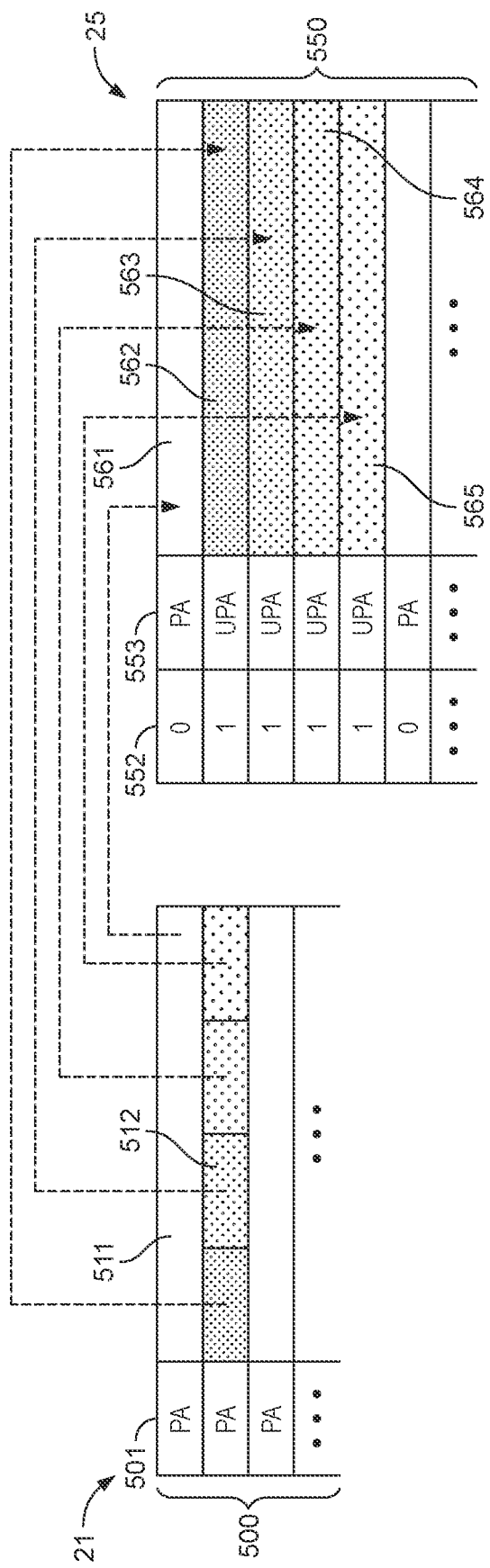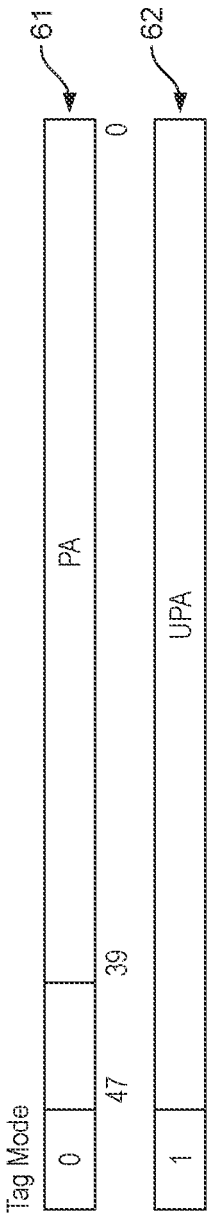
FIG. 6A
FIG. 6B

CACHE SYSTEMS WITH AGE-BASED EVICTION

BACKGROUND

The technology described herein relates to cache systems and in particular to cache operations in data processing systems, such as a graphics processing system.

In data processing systems, to assist with storing data locally to a processor while data processing operations using the data are being performed, a cache system may be used. This can help to reduce the need to fetch data from slower data stores, such as main memory of the data processing system.

In some systems, to (further) reduce an amount of data that needs to be transferred to and from memory, data is stored in memory in compressed form, but to allow the processor to operate on the data in decompressed form, the data is cached in the cache system in decompressed form. For example, in the case of a block-based compression scheme, a cache may include one or more cache entries that include decompressed data that corresponds to a single compression block that is stored in memory in compressed form.

The Applicants believe that there remains scope for improvements to cache operations in data processing systems, such as graphics processing systems.

BRIEF DESCRIPTION OF THE DRAWINGS

Embodiments of the technology described herein will now be described by way of example only and with reference to the accompanying drawings, in which:

FIG. 6A shows a cache system in accordance with an embodiment of the technology described herein;

FIG. 6B shows cache tags in accordance with an embodiment of the technology described herein;

Like reference numerals are used for like components where appropriate in the drawings.

DETAILED DESCRIPTION

Figure 1:
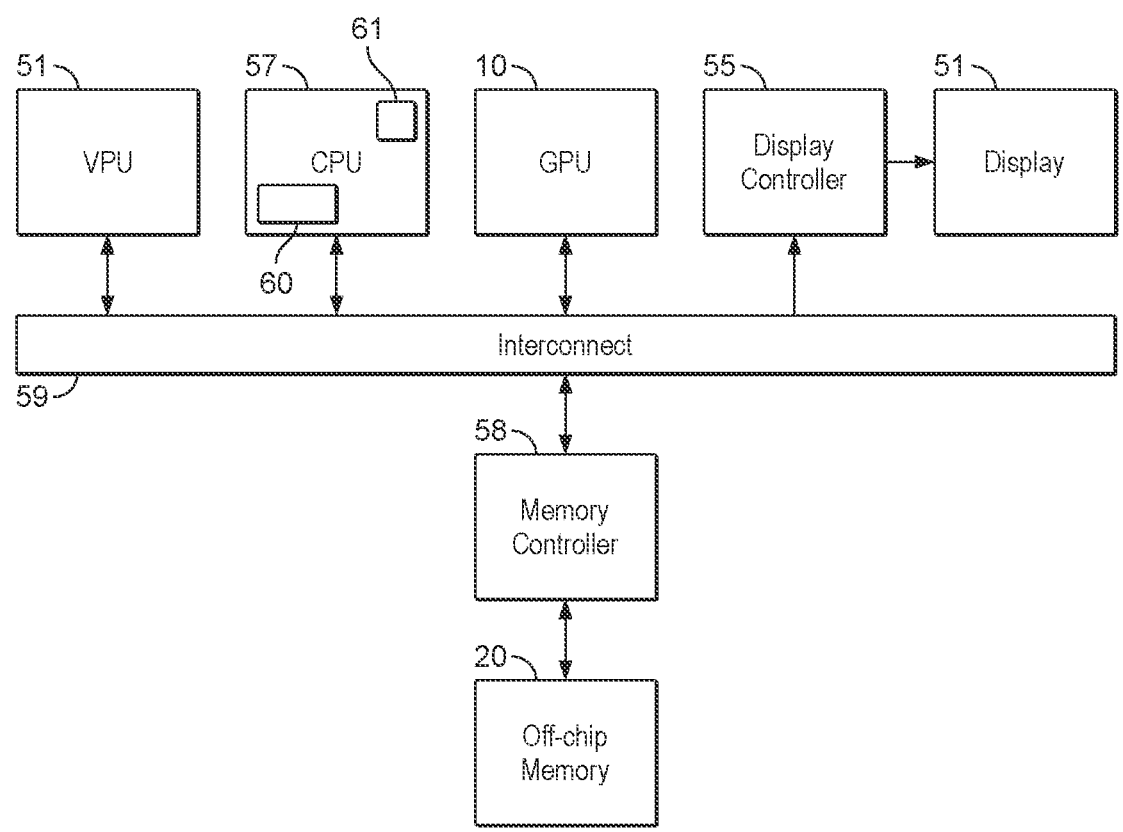
FIG. 1 shows a graphics processing system that may be operated in accordance with an embodiment of the technology described herein.

A first embodiment of the technology described herein comprises a cache system that is operable to cache data stored in memory for a processor; the cache system comprising:

a cache operable to cache data for compression blocks; and an eviction circuit configured to, when it is desired to evict a cache entry from the cache:

select a cache entry to evict from the cache using an age of any compression blocks that the cache is caching data for; and evict the selected cache entry from the cache.

A second embodiment of the technology described herein comprises a method of operating a cache system that is operable to cache data stored in memory for a processor, wherein the cache system comprises a cache operable to cache data for compression blocks;

the method comprising, when it is desired to evict a cache entry from the cache:

selecting a cache entry to evict from the cache using an age of any compression blocks that the cache is caching data for; and evicting the selected cache entry from the cache.

The technology described herein relates to a cache system that includes at least one cache that caches data stored in memory for a processor. In embodiments, (at least part of) the cache system forms part of the processor. Thus, embodiments of the technology described herein relate to a (data) processor, such as a graphics processor, that comprises the cache system. In embodiments, the cache system forms part of a data processing system that comprises the (data) processor and the memory. Thus, embodiments of the technology described herein relate to a data processing system, such as a graphics processing system, that includes a cache system including a cache that caches data stored in a memory system of the data processing system for a processor of the data processing system. The processor may thus be, and in an embodiment is, operable to receive data from the memory system by reading from the cache, and/or to send data to the memory system by writing to the cache.

In a typical cache eviction (replacement) policy, when it is desired to make room for new data in a cache, an oldest cache entry of a set of cache entries of the cache is selected for eviction, and evicted (replaced). That is, a cache entry of a set of cache entries is selected for eviction based on the age of each cache entry of the set. For example, in a first in first out (FIFO) cache eviction policy, the cache entry that was allocated least recently is selected for eviction. In a least recently used (LRU) cache eviction policy, the cache entry that was accessed (read from and/or written to) least recently is selected for eviction. If a "dirty" cache entry is selected for eviction, eviction of the selected cache entry will typically involve updating memory and/or one or more other caches of the cache system, e.g. so as to maintain cache coherence.

The technology described herein relates to the situation in which a cache can cache compression block data. In particular, embodiments of the technology described herein relate to the situation in which the cache can cache compressed data for a compression block in decompressed form, e.g. and in embodiments, such that eviction of a cache entry from the cache may trigger a compression operation in which dirty data is compressed, and resulting compressed data is written to memory and/or one or more other caches.

In embodiments of the technology described herein, when it is desired to make room for new data in a cache that can cache compression block data, a cache entry of the cache is selected for eviction based on, inter alia, an age of any compression block(s) that the cache is (currently) caching data for. For example and in embodiments, a cache entry (e.g. cache line) that is caching data for an oldest compression block is selected for eviction, and evicted. Thus, embodiments of the technology described herein relate to a cache eviction policy that takes compression block age into account.

The Applicants have recognised that where a cache is caching compressed compression block data in decompressed form, evicting data from the cache may trigger a relatively expensive compression operation. Furthermore, it can be the case that compression operations are triggered for a compression block before processing for the compression block has completed, such that compression operations are performed that are effectively redundant.

As will be discussed in more detail below, the Applicants have found that taking compression block age into account when selecting a cache entry for eviction can reduce the likelihood that a cache entry that is caching data for a newer (e.g. relatively active) compression block is evicted, even where the individual cache entry itself is relatively old (e.g. inactive). This can reduce the likelihood of a compression operation being triggered for a compression block before processing for the compression block has completed, and thus reduce the number of effectively redundant compression operations performed per compression block. This can accordingly save processing requirements.

It will be appreciated, therefore, that the technology described herein can provide an improved cache system, data processor and data processing system.

The (data) processor can comprise any suitable and desired processor, such as a central processing unit (CPU). The (data) processor is in an embodiment a graphics processor (GPU). The processor may be a single or multi-cored data processor. Thus, the (e.g. graphics) processor in an embodiment comprises one or more programmable execution units (e.g. shader cores), that may each be operable to execute (e.g. shader) programs.

The memory (system) can comprise any suitable memory (of the data processing system), and may be configured in any suitable and desired manner. In embodiments, it is a main memory of the data processing system. In embodiments, it is a memory that is off chip from the processor, i.e. an external (main) memory (external to the processor).

The cache of the cache system from which an entry is selected for eviction can be any suitable cache of the cache system. In an embodiment, the cache is a cache that (a programmable execution unit (e.g. shader core) of) the (e.g. graphics) processor has (in an embodiment direct) access to. Thus, the cache is in an embodiment a cache that is local to (a programmable execution unit (e.g. shader core) of) the processor. In an embodiment, the cache is a load/store cache.

Thus, in an embodiment, (a programmable execution unit (e.g. shader core) of) the processor is operable to receive data from the memory system by reading (directly) from the cache. Correspondingly, (a programmable execution unit (e.g. shader core) of) the processor is in an embodiment operable to send data to the memory system by writing data (directly) to the cache, with the written data then being (potentially) written back (e.g. evicted) to the memory system by the cache system appropriately.

The cache could be a direct-mapped cache, or a fully associative cache. In an embodiment, the cache is a set-associative cache. Thus, in an embodiment, the cache includes a set or sets of cache entries that could be evicted, and a cache entry of a set is selected for eviction. A set may include some of all of the cache entries that the cache includes.

The cache system may be a single level cache system. In this case, evicting a cache entry from the cache may comprise evicting the cache entry from the cache to memory.

In an embodiment, the cache system is a multi-level cache system. In this case, in an embodiment, the cache from which an entry is selected for eviction is a lower level cache (i.e. a cache that is (logically) closer to (a programmable execution unit (e.g. shader core) of) the processor), and the cache system further comprises a higher level cache (that is (logically) closer to the memory system). Thus, in an embodiment, evicting a cache entry from the cache comprises evicting the cache entry from the (lower level) cache to a higher level cache.

For example, and in an embodiment, the cache from which an entry is selected for eviction is a level 1 (L1) cache, and the cache system in an embodiment further comprises a level 2 (L2) cache (logically) in between the memory system and the L1 cache. Other levels of the cache system would be possible. For example, the cache system could comprise a level 0 (L0) and/or level 3 (L3) cache.

In an embodiment, the cache system comprises plural (lower level) caches (e.g. each associated with a respective programmable execution unit (e.g. shader core)), each of which can evict cache entries in the manner of the technology described herein. In an embodiment, each of the plural caches can communicate with the (same) higher level (e.g. L2) cache.

A (and in an embodiment each) cache of the cache system should, and in an embodiment does, comprise a respective set of cache entries, such as and in an embodiment, a respective set of cache lines. Each cache entry (e.g. cache line) in the cache system in an embodiment has the same (fixed) size, such as 16 bytes, 32 bytes, 64 bytes, 128 bytes, 256 bytes, etc. A (and in an embodiment each) cache entry (e.g. cache line) should, and in an embodiment does, include respective data that the cache entry caches, and in an embodiment an identifier (e.g. tag) for the data, that in an embodiment indicates a location (address) in the memory system where corresponding data is stored. A (and in an embodiment each) cache entry (e.g. cache line) in an embodiment further comprises state information indicating a status of the cache entry, such as, and in an embodiment, whether the respective data is valid or invalid, and/or whether or not the respective data is "dirty", and/or whether or not the respective data is cached by another cache of the cache system (i.e. whether the data is "shared" or "unique"), etc.

In the technology described herein, the cache from which an entry is selected for eviction should be, and is in an embodiment, used and operable to cache compressed data for a compression block in decompressed form. That is, the cache should be, and is in an embodiment, used and operable to maintain copies of compression block data that is stored in the memory system in compressed form, in one or more of its cache entries in the form of decompressed (uncompressed) data.

In an embodiment, as well as being able to cache compressed compression block data in decompressed form, the cache can also cache uncompressed data. That is, the cache is in an embodiment (further) operable to maintain copies of data that is stored in the memory system in uncompressed form in one or more of its cache entries in the form of uncompressed data.

Thus, in an embodiment, the cache is operable to cache uncompressed data, and compressed compression block data in decompressed (uncompressed) form for the processor.

In the case of compressed compression block data, (a programmable execution unit (e.g. shader core) of) the processor is in an embodiment operable to receive data that is stored the memory system in compressed form by reading corresponding decompressed data from the cache, and to write data in uncompressed ("to be compressed") form to the cache, with the written data then (potentially) being (compressed and) written back to the memory system in compressed form. In the case of uncompressed data, (a programmable execution unit (e.g. shader core) of) the processor is in an embodiment operable to receive data that is stored in the memory system in uncompressed form by reading corresponding uncompressed data from the cache, and to write data in uncompressed form to the cache, with the written data then being (potentially) written back to the memory system in uncompressed form.

Correspondingly, evicting a (dirty) cache entry from the cache in an embodiment comprises: when a cache entry that caches (dirty) uncompressed data is selected for eviction, writing cached data to a higher level cache of the cache system and/or memory; and when a cache entry that caches (dirty) (compressed) compression block data (in decompressed form) is selected for eviction, compressing cached data and writing resulting compressed data to a higher level cache of the cache system and/or memory.

To facilitate compression, the system should, and in an embodiment does, comprise a compression codec, e.g. and in an embodiment a decoder and an encoder. Thus, in an embodiment, (a programmable execution unit (e.g. shader core) of) the processor is operable to receive data that is stored the memory system in compressed form by reading corresponding decompressed data from the cache that has been decompressed by the decoder, and to write data in "to be compressed" (uncompressed) form to the cache, with the written data then being (potentially) compressed by the encoder and written back to the memory system in compressed form.

The compression codec (decoder and encoder) could be (logically) between the memory system and the cache system, e.g. such that compressed data from the memory system is decompressed before being stored in the cache system, and such that "to be compressed" (uncompressed) data in the cache system is compressed at the point when it is to be written back (e.g. evicted) to the memory system. In an embodiment, the compression codec (decoder and encoder) is provided (logically) between the (lower level) cache from which an entry is selected for eviction and a (the) higher level cache of the cache system. Thus, in an embodiment, the cache system comprises a (the) compression codec (decoder and encoder) (logically) between the (lower level) cache and a (the) higher level cache.

Any suitable and desired compression codec (decoder and encoder) that implements any suitable and desired compression scheme may be used. The compression scheme should be, and is in an embodiment, a block-based compression scheme. Thus, the compression codec (decoder and encoder) should be, and is in an embodiment, configured to decode and encode sets of data elements on a block by block basis. An array of data elements (e.g. corresponding to an image or texture) may be, in effect, divided into plural separate blocks or regions (i.e. compression blocks), and one or more encoded (i.e. compressed) blocks of data may be generated in respect of each different block or region (i.e. compression block) that the array of data elements is divided into. A block-based compression scheme may allow each block to be separately accessed and modified, for example.

The compression blocks (regions) that the data array is divided into for encoding purposes can take any suitable and desired form. Each compression block may comprise a sub-set of the data elements (positions) in the array, i.e. correspond to a particular region of the array. In an embodiment the array is divided into non-overlapping and regularly sized and shaped (compression) blocks. The (compression) blocks are in an embodiment square, but other arrangements could be used if desired.

In an embodiment, the data array is divided into 16×16 (compression) blocks (i.e. (compression) blocks of 16×16 array positions (entries)). In one such arrangement, a single encoded (compressed) block is generated for each 16×16 (compression) block. Thus, in the case of a texture map, for example, a separate encoded block would be generated for each (non-overlapping) 16×16 texel region (compression block) of the texture map, and in the case of an image or a frame, an encoded block would be generated for each 16×16 pixel or sampling position region (compression block) of the image or frame.

Other arrangements would be possible. For example, instead of generating a single encoded block for a e.g. 16×16 (compression) block, plural, such as four, encoded blocks, each representing e.g. an 8×8 or a 16×4 block within the e.g. 16×16 (compression) block could be generated (in effect therefore, the data array would be divided into 8×8 or 16×4 blocks).

The compression scheme may encode data in a lossless or lossy manner. For example, Arm Frame Buffer Compression (AFBC), e.g. as described in US 2013/0036290 and US 2013/0198485, the entire contents of which is hereby incorporated by reference, may be used. Alternatively, Arm Fixed Rate Compression (AFRC), e.g. as described in WO 2020/115471, the entire contents of which is hereby incorporated by reference, may be used. Other, e.g. block-based, compression schemes would be possible.

Compression block data can be cached by the cache system in any suitable and desired manner. In an embodiment, a (and each) compression block (when uncompressed) corresponds to an integer number of cache entries of the cache system, e.g. 4 or 8 cache lines. (Thus, for example, in the case of 64 byte cache entries, each compression block in its uncompressed form may, e.g., comprise and be stored as a 256 or 512 byte block of data.)

In an embodiment, evicting a cache entry for a compression block from the cache thus comprises gathering all of the cache entries (e.g. cache lines) corresponding to the same compression block, (the decoder) compressing the gathered cache entries, and writing resulting compressed data to a higher level cache of the cache system and/or memory. Where the cache includes plural cache entries that cache data for the same compression block, evicting one of the cache entries for the compression block may involve (and in an embodiment trigger) the eviction of all other cache entries for the (same) compression block.

In an embodiment (e.g. in the case of AFBC), a (and in an embodiment each) compression block is associated with a respective header and associated payload data, and the cache system in an embodiment caches the header data and payload data for a compression block in separate cache entries. For example, and in an embodiment, header data for a compression block may be cached in the cache in a (in an embodiment single) cache entry, and payload data for the (same) compression block may be cached in the cache in one or more (e.g. plural) other, related cache entries. In this case, in an embodiment, eviction of a header cache entry triggers eviction of any (all) related payload cache entries.

Eviction operation in accordance with the technology described herein can be triggered in any suitable and desired manner. In an embodiment, an eviction operation is triggered by more space being required in the cache. In an embodiment, an eviction operation according to the technology described herein is triggered in response to a "cache miss", where all cache entries of the cache are validly caching data.

In the technology described herein, a cache entry is selected for eviction using (at least) compression block age. A cache entry may be selected for eviction based only on compression block age, but in an embodiment, a cache entry is selected for eviction using (based on) compression block age and one or more other considerations, such as and in an embodiment, cache entry age.

In an embodiment, each cache entry of a set of cache entries that could be evicted is considered for eviction, and one of the considered cache entries is selected (and evicted). In an embodiment, for each cache entry that is considered, information indicative of a representative age is determined, and the determined age indicating information is compared to select an entry for eviction.

Age indicating information can take any suitable and desired form. Age indicating information could, for example, comprise a relative indication of age, such as an age rank (e.g. in the form of one or more "age-bits"), or an absolute indication of age, such as a timestamp. Age indicating information could, for example, be indicative of when the cache system started caching associated data, e.g. when a cache entry was (initially) allocated, or when associated data was used, e.g. when a cache entry was (most recently) accessed, e.g. read from or written to.

In an embodiment, the manner in which an age is determined for a cache entry depends on whether the cache entry is caching (compressed) compression block data (in decompressed form) or uncompressed data. Thus, in an embodiment, for each cache entry that is considered, it is determined whether the respective cache entry is caching data for a compression block (or whether the respective cache entry is caching uncompressed data).

It can be determined whether a cache entry is caching compression block data (or uncompressed data) in any suitable and desired manner. In an embodiment, entries in the cache that cache uncompressed data are identified (tagged) using a first address domain, and entries in the cache that cache compression block data (in decompressed (uncompressed) form) are identified (tagged) using a second, different address domain. In this case, in an embodiment, it is determined whether a cache entry is caching compression block data (or uncompressed data) based on which address domain the cache entry is identified (tagged) using.

In an embodiment, the cache system maintains information indicating which address domain applies to each cache entry, and this address domain indicating information is used to determine which address domain a cache entry is identified (tagged) using. The address domain indicating information can take any suitable and desired form. In an embodiment, each (lower level) cache entry has associated with it, and in an embodiment includes, an indicator, such as a flag, such as one or more respective bits, that indicate which address domain applies.

The different address domains can be defined in any suitable and desired manner. In an embodiment, the first address domain comprises (only) (or is based (only) on) physical addresses of the memory system. The first address domain is thus in an embodiment a physical address domain (physical address space). In an embodiment, the second address domain (space) is based on the compression scheme used. For example, and in an embodiment, an (each) address of the second address domain is based on, and is in an embodiment a combination of, such as a concatenation of, a physical address for a compression block, and an indication (e.g. index) of a sub-block or region within that compression block.

Once it has been determined whether a cache entry is caching compression block data or uncompressed data, a representative age for the cache entry can be determined in any suitable and desired manner.

In an embodiment, when it is determined that a cache entry is caching uncompressed data (when it is determined that the cache entry is not caching data for a compression block), information indicating an age of the cache entry itself is determined, e.g. and in an embodiment, in a "normal" manner for the cache system in question. For example, and in an embodiment, an age of a cache entry representing when (the time at which) the cache entry was allocated or accessed (e.g. read from or written to) is determined, e.g. and in an embodiment, by reading a timestamp for the cache entry.

On the other hand, in an embodiment, when it is determined that a cache entry is caching data for a compression block, information indicating an age of the respective compression block is determined (e.g. as opposed to determining an age representative (only) of an age of the cache entry itself).

It will be appreciated here that information indicative of an age of a compression block should, and in an embodiment does, indicate an age of a compression block as a whole. For example, in the case of a compression block (when uncompressed) corresponding to plural different cache entries, the age of the compression block should be the same for all of the plural corresponding cache entries, e.g. even where the respective ages of the individual cache entries are different.

Information indicating an age of a compression block can be determined in any suitable and desired manner. An age of a compression block could represent when (the time at which) (any) data for the compression block was (e.g. most recently) accessed (e.g. read or written). In an embodiment, an age of a compression block represents when (the time at which) a cache entry for the compression block was (e.g. first) allocated in the cache. Thus, an age of a compression block should be, and is in an embodiment, an age of the compression block in the cache, and in an embodiment represents when the cache started caching data for the compression block.

Determining an age that represents when the cache started caching data for a compression block can be achieved in any suitable and desired manner. In an embodiment, the cache system comprises a compression block cache operable to maintain an entry for each compression block that the cache is caching data for. In an embodiment, when a cache entry in the cache is allocated for a new compression block, a corresponding new entry is allocated in the compression block cache, and once there are no (valid) cache entries corresponding to a compression block remaining in the cache, the corresponding entry in the compression block cache is deallocated. In this case, in an embodiment, information indicating an age of a compression block is determined by determining when an entry of the compression block cache was (initially) allocated for the compression block, e.g. and in an embodiment, by reading a timestamp for the appropriate compression block cache entry.

In an embodiment, once a representative age has been determined for each cache entry being considered for eviction, the determined ages are compared, and one of the considered cache entries is selected for eviction based on the comparison.

It will be appreciated here that in the case of all of the cache entries that are being considered for eviction caching compression block data, the comparison will in an embodiment comprise comparing one or more compression block ages. In the case of all of the cache entries that are being considered for eviction caching uncompressed data, the comparison will in an embodiment comprise comparing one or more cache entry ages.

In the case of some of the cache entries that are being considered for eviction caching compression block data and others caching uncompressed data, the comparison will in an embodiment comprise comparing one or more compression block ages and one or more cache entry ages.

To facilitate this latter case, compression block ages and cache entry ages are in an embodiment determined so as to be directly comparable with each other. For example, and in an embodiment, an absolute indication of age, such as a timestamp, is determined for both compression blocks and cache entries.

A cache entry can be selected for eviction based on a comparison of ages in any suitable and desired manner. It would be possible to select e.g. a youngest cache entry, but in an embodiment the oldest indicated cache entry is selected for eviction (and evicted).

In the case of there being plural cache entries having the same determined e.g. oldest age, an appropriate tiebreaker may be used to select one of the plural cache entries for eviction. For example, and in embodiments, where an entry that caches compression block data and an entry that caches uncompressed data are determined to have the same age, the entry that caches uncompressed data may be preferentially selected for eviction, e.g. so as to avoid triggering a compression operation. It will be appreciated, however, that in the case of plural cache entries for the same compression block being found to have the same, e.g. oldest, age, a tiebreaker may not be required e.g. if eviction of one of the cache entries involves (e.g. triggers) eviction of the other(s) (e.g. as described above).

Thus, in an embodiment, for each cache entry that is considered for eviction, it is determined whether the cache entry is caching (compressed) compression block data (in decompressed form) or uncompressed data. When it is determined that a cache entry is caching uncompressed data, an age of the respective cache entry is determined. When it is determined that a cache entry is caching (compressed) compression block data (in decompressed form), an age of the respective compression block is determined. Once an age has been determined for each cache entry being considered for eviction, the compression block corresponding to the oldest age is selected, and evicted.

The technology described herein can be implemented in any suitable system, such as a suitably configured microprocessor based system. In an embodiment, the technology described herein is implemented in a computer and/or micro-processor based system. The technology described herein is in an embodiment implemented in a portable device, such as, and in an embodiment, a mobile phone or tablet.

The technology described herein is applicable to any suitable form or configuration of processor and data processing system, such as graphics processors (and systems) having a "pipelined" arrangement (in which case the graphics processor comprises a rendering pipeline). It may be applicable, for example, to tile-based graphics processors and graphics processing systems. Thus the processor may be a tile-based graphics processor.

In an embodiment, the various functions of the technology described herein are carried out on a single data processing platform that generates and outputs data, for example for a display device.

As will be appreciated by those skilled in the art, the data (e.g. graphics) processing system may include, e.g., and in an embodiment, a host processor that, e.g., executes applications that require processing by the data (e.g. graphics) processor. The host processor will send appropriate commands and data to the data (e.g. graphics) processor to control it to perform data (e.g. graphics) processing operations and to produce data (e.g. graphics) processing output required by applications executing on the host processor. To facilitate this, the host processor should, and in an embodiment does, also execute a driver for the processor and optionally a compiler or compilers for compiling (e.g. shader) programs to be executed by (e.g. a programmable execution unit of) the processor.

The processor may also comprise, and/or be in communication with, one or more memories and/or memory devices that store the data described herein, and/or store software (e.g. (shader) program) for performing the processes described herein. The processor may also be in communication with a host microprocessor, and/or with a display for displaying images based on data generated by the processor.

The technology described herein can be used for all forms of input and/or output that a data (e.g. graphics) processor may use or generate. For example, the data (e.g. graphics) processor may execute a graphics processing pipeline that generates frames for display, render-to-texture outputs, etc. The output data values from the processing are in an embodiment exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc. . . . . .

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described.

As discussed above, embodiments of the technology described herein relate to a cache replacement policy that takes compression block ages into account.

FIG. 1 shows a graphics processing system that may operate in accordance with an embodiment.

The exemplary graphics processing system shown in FIG. 1 comprises a host processor comprising a central processing unit (CPU) 57, a graphics processor (graphics processing unit (GPU)) 10, a video processing unit (VPU) 51, and a display controller 55. As shown in FIG. 1, these processing units can communicate via an interconnect 59 and have access to an off-chip memory system (memory) 20 via the bus 59 and a memory controller 58. Other processing units may be provided.

In use of this system, the CPU 57, and/or VPU 51 and/or GPU 10 will generate frames (images) to be displayed, and the display controller 55 will provide frames to a display 51 for display. To do this the CPU 57, and/or VPU 51 and/or GPU 10 may read in data from the memory 20 via the interconnect 59, process that data, and return data to the memory 20 via the interconnect 59. The display controller 55 may then read in that data from the memory 20 via the interconnect 59 for display on the display 51.

For example, an application 60, such as a game, executing on the host processor (CPU) 57 may require the display of graphics processing unit rendered frames on the display 51. In this case, the application 60 will send appropriate commands and data to a driver 61 for the graphics processing unit 10 that is executing on the CPU 57. The driver 61 will then generate appropriate commands and data to cause the graphics processing unit 10 to render appropriate frames for display and store those frames in appropriate frame buffers in main memory 20. The display controller 55 will then read those frames into a buffer for the display from where they are then read out and displayed on the display panel of the display 51.

As part of this processing, the graphics processor 10 will read in data, such as textures, geometry to be rendered, etc. from the memory 20, process that data, and then return data to the memory 20 (e.g. in the form of processed textures and/or frames to be displayed), which data will then further, e.g. as discussed above, be read from the memory 20, e.g. by the display controller 55, for display on the display 51.

Thus, there will be a need to transfer data between the memory 20 and the graphics processor 10. In order to facilitate this, and to reduce the amount of data that needs to be transferred to and from memory during processing operations, the data may be stored in a compressed form in the memory 20.

As the graphics processor 10 will typically need to operate on the data in an uncompressed form, this accordingly means that data that is stored in the memory 20 in compressed form will need to be decompressed before being processed by the graphics processor 10. Correspondingly, data produced by the graphics processor 10 may need to be compressed before being stored in the memory 20.

Figure 2:
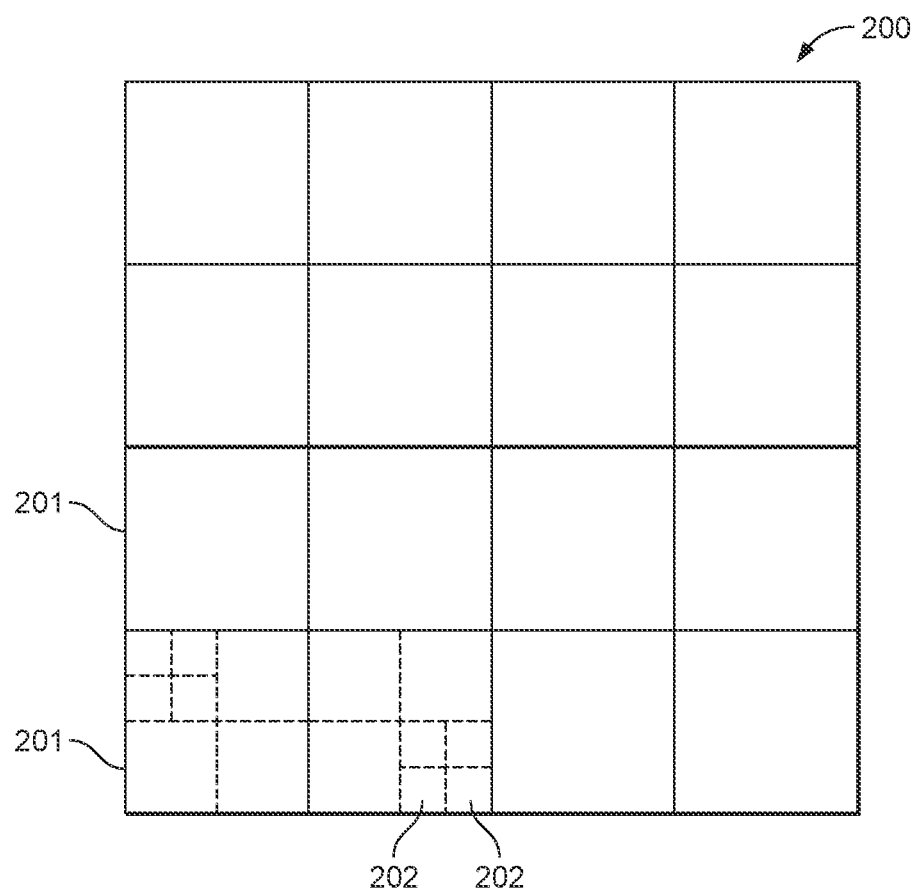
FIG. 2 shows a data array that may be processed in accordance with an embodiment of the technology described herein.

FIG. 2 shows schematically an exemplary data array 200 that may be generated and/or used by the graphics processor 10, and stored in the memory 20 in a compressed form, according to an embodiment.

The array of data 200 is a two-dimensional data array containing a plurality of data elements (i.e. containing data array entries at a plurality of particular positions within the array). The data array 200 could be any suitable and desired array of data, such as data representing an image.

In a graphics processing context, the data array 200 could, for example, be a texture map (i.e. an array of texture elements (texels)), or an array of data representing a frame to be displayed (in which case the data array may be an array of pixels to be displayed). In the case of a texture map, each data entry (position) in the data array will represent an appropriate texel value (e.g. a set of colour values, such as RGBA, or luminance and chrominance, values for the texel). In the case of a frame for display, each data entry (position) in the array will indicate a set of colour values (e.g. RGB values) to be used for displaying the frame on a display.

It will be appreciated, however, that the technology described herein extends to more general "compute" processing (rather than graphics processing per se), such as in accordance with the OpenCL or Vulkan APIs, or other forms of kernel execution. Thus, for example, in other embodiments the data array 200 is generated and/or used in compute processing.

In the present embodiments, the data array 200 is encoded and compressed to provide a set of data representing the data array 200 that is then stored in memory 20, and from which set of data, the data values of individual data elements in the data array 200 can be derived by decoding the data representing the data array 200.

In the present embodiments, as shown in FIG. 2, to encode and compress the data array 200, the data array 200 is first divided into a plurality of non-overlapping, equal size and uniform blocks 201, each block corresponding to a particular region of the data array 200. Each block 201 that the data array 200 is divided into is further sub-divided into a set of non-overlapping, uniform and equal-size sub-blocks 202. Each larger block 201 may thus be referred to as a "superblock".

In the present case, each block (superblock) 201 corresponds to 16×16 elements (positions) within the data array 200 (i.e. a block of 16×16 texels in the case of a texture map), and each block (superblock) 201 is divided into a set of sixteen sub-blocks 202. Each sub-block 202 accordingly corresponds to a 4×4 data element region within the block 201 (e.g. 4×4 texels in the texture map). Other arrangements would be possible.

The blocks 201 of the data array 200 are then encoded to provide a compressed representation of the blocks of the data array 200.

The encoding scheme that is used to encode blocks of the data array 200 can be any suitable block-based encoding scheme. The encoding scheme may encode the data in a lossless manner such that the original array of data elements can be perfectly reconstructed from the encoded data. For example, Arm Frame Buffer Compression (AFBC) may be used. In this case, the memory 20 may include a header buffer that stores a header data block for each block 201 that the data array 200 has been divided into, with each header data block including a pointer pointing to compressed sub-block 202 data for the respective block 201.

Alternatively, the encoding scheme may encode to fixed-size data packets. In this case, the compression into the fixed size data packets will be inherently 'lossy'. For example, Arm Fixed Rate Compression (AFRC) may be used. In this case, respective sets of plural blocks may be grouped together with an associated "header" block, as a respective "page" of the memory system.

Figure 3:
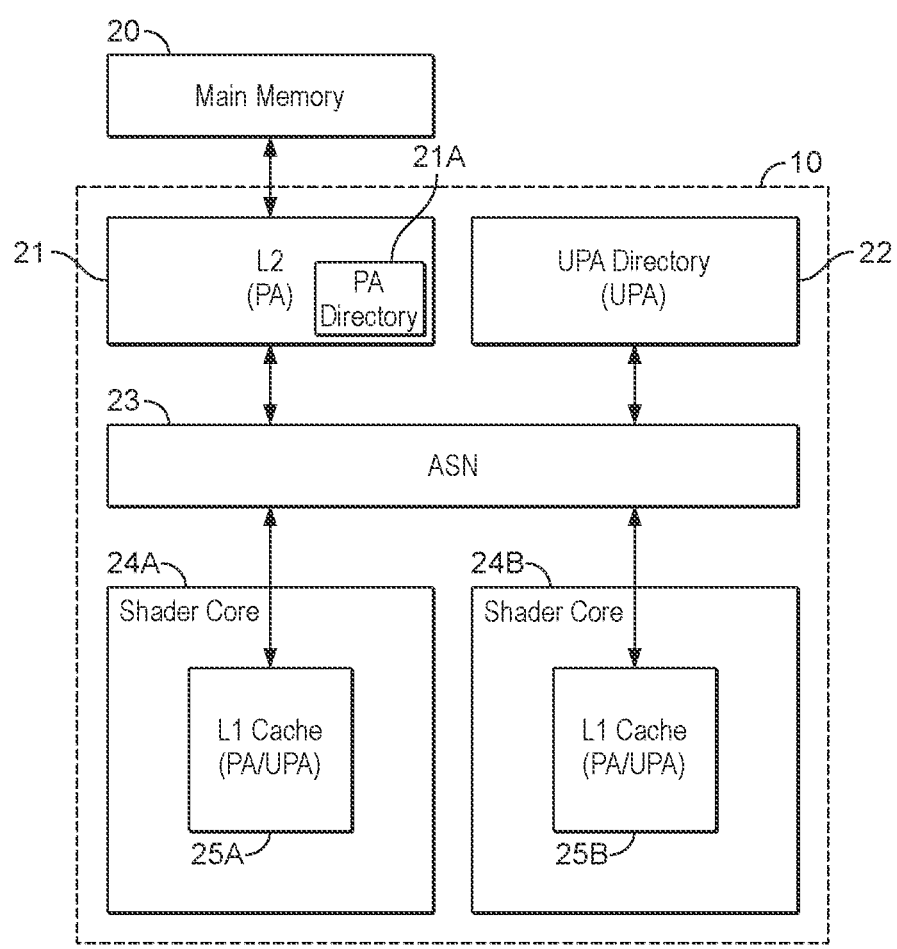
FIG. 3 shows a graphics processor in accordance with an embodiment of the technology described herein.
Figure 4:
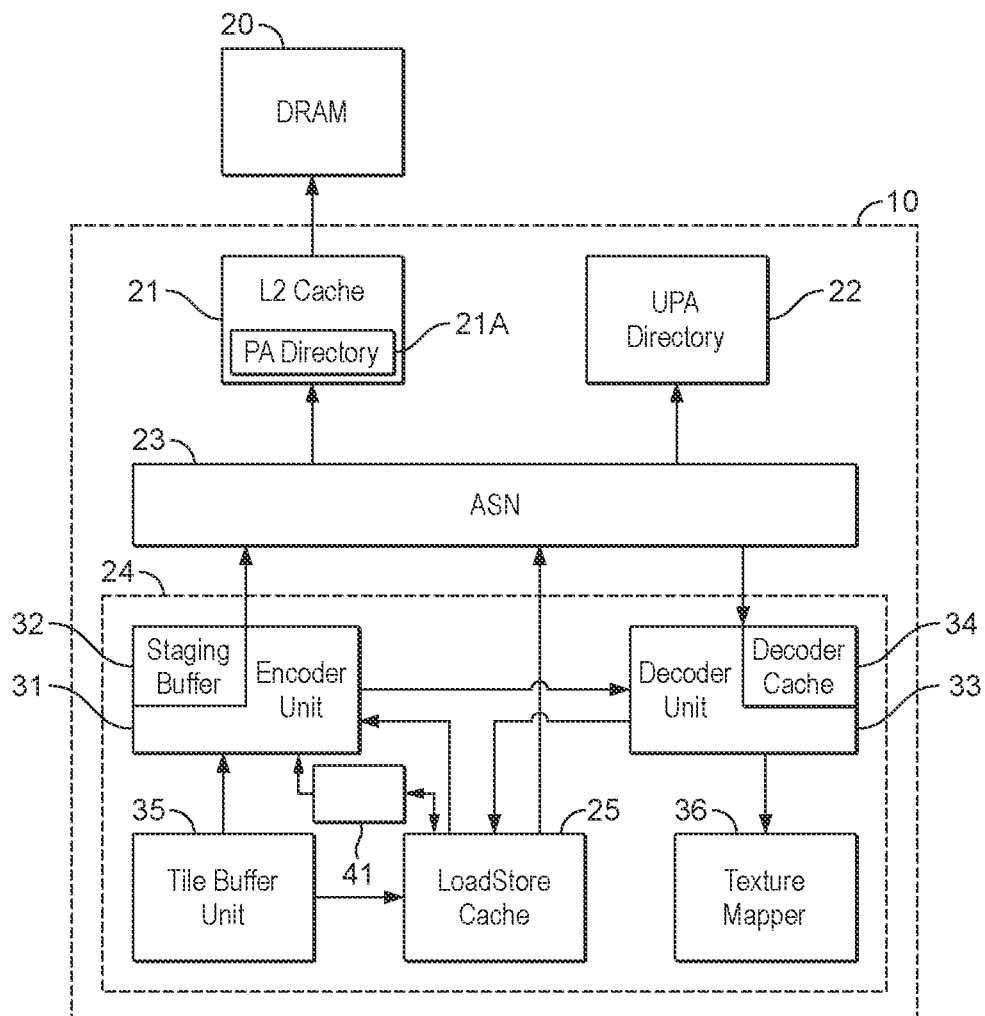
FIG. 4 shows a graphics processor in accordance with an embodiment of the technology described herein.
Figure 5:
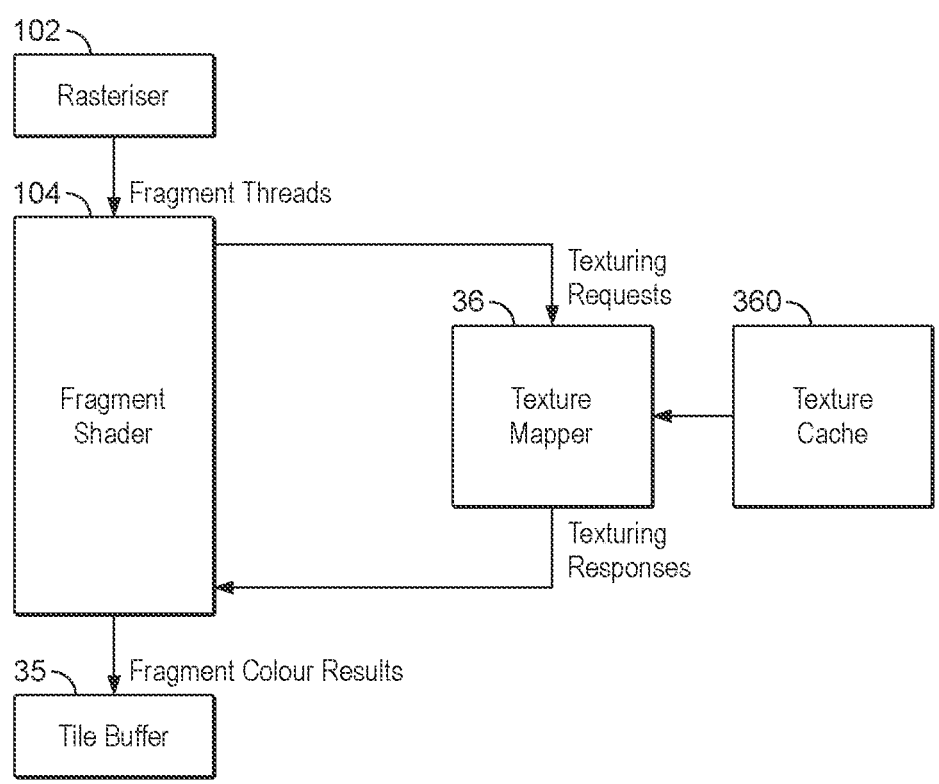
FIG. 5 shows a graphics processor in accordance with an embodiment of the technology described herein.

FIGS. 3, 4 and 5 show schematically elements of the graphics processor 10 of the system shown in FIG. 1 that are relevant to the operation of the present embodiments. As will be appreciated by those skilled in the art there may be other elements of the graphics processor 10 that are not shown in FIGS. 3, 4 and 5.

As shown in FIG. 3, the graphics processor 10 of the present embodiment includes plural processing cores (shader cores) 24A, 24B. FIG. 3 shows two shader cores 24A, 24B, but it will be appreciated that other numbers of shader cores are possible.

As shown in FIG. 3, the graphics processor 10 further includes a cache system that is operable to transfer data from the memory system 20 to the processing cores (shader cores) 24A, 24B of the graphics processor 10, and conversely to transfer data produced by the processing cores 24A, 24B of the graphics processor 10 back to the memory 20.

The cache system shown in FIG. 3 is illustrated as comprising two cache levels: an L2 cache 21 that is closer to the memory 20, and a respective L1 cache 25A, 25B associated with each shader core 24A, 24B of the graphics processor 10 (and from which the data is provided to the respective shader cores 24A, 24B). Other caches and cache levels would be possible. For example, an L3 cache may be provided in between the L2 cache 21 and memory system 20.

As shown in FIG. 3, in this embodiment data is transferred from the memory system 20 to an L1 cache 25A, 25B via the L2 cache 21, and from an L1 cache 25A, 25B to the respective shader core 24A, 24B (and vice-versa).

The graphics processor 10 also includes, as shown in FIG. 3, an appropriate interconnect 23 (in this case in the form of an asynchronous switch network (ASN)) for transferring data between the L2 cache 21 and the L1 caches 25A, 25B (shader cores 24A, 24B).

In the present embodiments, in order to facilitate the use of compressed data, compressed data received from the memory system 20 via the L2 cache 21 is decompressed before being stored in a decompressed form in an L1 cache 25A, 25B for use by the respective shader cores 24A, 24B, and, conversely, data that is to be evicted from an L1 cache 25A, 25B and to be stored in a compressed form is compressed prior to that data being written to the L2 cache 21. Thus, the cache system implements "cache-based compression". The arrangement in this regard is shown in more detail in FIG. 4.

FIG. 4 illustrates a single shader core 24 of the graphics processor 10 for clarity, but it will be appreciated that each shader core 24A, 24B may be arranged as illustrated in FIG. 4. As shown in FIG. 4, in the present embodiment, each shader core 24 includes a respective encoder 31, decoder 33, tile buffer unit 35, texture mapper 36, Load/Store (L1) cache 25, and superblock cache (SBC) 41. In the present embodiment, the texture mapper 36 has a separate texture cache. As will be appreciated by those skilled in the art there may be other elements of the shader core 24 that are not shown in FIG. 4.

The decoder 33 is operable to decompress compressed data received from the memory system 20 via the L2 cache 21 before providing that data to be stored in decompressed form in the L1 cache 25 for use by the respective shader core 24. As shown in FIG. 4, in the present embodiment, the decoder 33 is further operable to decompress compressed texture data and provide that data to the texture cache of the texture mapper 36.

As shown in FIG. 4, the decoder 33 includes a decoder cache 34 for the temporary storage of data when performing a decoding operation.

Conversely, the encoder 31 is operable to compress data that is to be evicted from the L1 cache 25 before providing that data to be stored in a compressed form in the L2 cache 21. As shown in FIG. 4, in the present embodiment, the encoder 31 is further operable to compress data that is to be written out to memory 20 by the tile buffer unit 35.

As shown in FIG. 4, the encoder 31 includes a staging buffer 32 for the temporary storage of data when performing an encoding operation.

To facilitate block-based compression, the superblock cache (SBC) 41 maintains information indicating which block(s) (superblock(s)) valid cache lines in the L1 cache 25 relate to. When a cache line in the L1 cache 25 is allocated for a new superblock 201, a corresponding new entry is allocated in the superblock cache (SBC) 41. An entry in the superblock cache (SBC) 41 is then deallocated once there are no valid cache lines corresponding the block in question remaining in the L1 cache 25.

FIG. 5 schematically illustrates the operation of the texture mapper 36 in the present embodiment in more detail. FIG. 5 shows a graphics processing example that involves fragment shading, but it will be appreciated that more general "compute" shading would be possible. As shown in FIG. 5, the graphics processor 10 executes a tile-based graphics processing pipeline that includes, inter alia, a rasterizer 102 and a renderer 104, and stores an output array in the tile buffer 35.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core 24, with the threads executing the shader program(s) that are to be used to process the fragments. A thread is executed for each sampling position that is to be shaded.

A shader program may include texturing instructions for texture mapping operations that are required to be executed by the texture mapper 36.

When a texturing instruction is encountered by the fragment shader 104, a texturing instruction is sent from the fragment shader 104 to the texture mapper 36, requesting the texture mapper 36 to perform a texturing operation.

When instructed by the fragment shader 104 to perform a texture mapping operation, the texture mapper 36 reads decompressed texture data 200 from the texture cache 360 of the cache system (as required), performs the texture mapping operation, and returns a (e.g. RGB) colour sampled from the texture back to the fragment shader 104, for use when shading the fragment and sampling position(s) in question.

The "shaded" fragment sampling positions from the fragment shader 104 are then stored as part of the output in the tile buffer 35. Once a full "tile" of output data has been generated and stored in the tile buffer 35 in this manner, its data is exported from the tile buffer 35 to the main memory 20 (e.g. to a frame buffer in main memory) for storage via the cache system, and the next tile is then processed, and so on, until sufficient tiles have been processed to generate the entire render output (e.g. frame (image) to be displayed).

The Applicants have recognised that when a data array 200 is being processed by different shader cores 24A, 24B that have their own local caches 25A, 25B, the caches should be operated coherently. They have furthermore recognised that where there is a separate texture cache 360 that can also cache that data, the texture cache 360 should also be operated coherently. Thus, in the present embodiments, the texture cache 360 is operated coherently with the Load/Store cache 25.

Returning to FIG. 4, in the present embodiment, as well as data being stored in the memory 20 and L2 cache 21 in compressed form, it is also possible for data to be stored in the memory 20 and L2 cache 21 in uncompressed form, and correspondingly transferred between the L1 cache 25 and the L2 cache 21 in uncompressed form. To facilitate this, as shown in FIG. 4, the L1 cache 25 can communicate with the L2 cache 21 via the interconnect 23, bypassing the encoder 31 and decoder 33.

Thus, in embodiments of the technology described herein, the L1 cache 25 can cache both data that is cached in the L2 cache 21 in compressed form, and data that is cached in the L2 cache 21 in uncompressed form.

The Applicants have recognised that for data that is cached in the L2 cache 21 in uncompressed form, there will be a "one-to-one" mapping between L1 and L2 cache lines, such that each L1 cache line will correspond to a respective single "parent" L2 cache line. In the case of data that is cached in the L2 cache 21 in compressed form, however, such a "one-to-one" mapping will typically not exist due to the expansion of data from compressed form to decompressed form, and typically plural L1 cache lines will correspond to the same "parent" L2 cache line. For example, in the case of a fixed compression ratio of 2:1, one cache line in the L2 cache 21 will correspond to two cache lines in the Load/Store (L1) cache 25 or texture mapper cache 360.

To allow for this, in the present embodiment, the L1 cache 25 is configured to use two separate address domains that are referred to as a "physical address" (PA) domain that is used for addressing data that is stored in memory 20 and the L2 cache 21 in uncompressed form, and an "uncompressed physical address" (UPA) that is used for addressing data that is stored in memory 20 and the L2 cache 21 in compressed form.

The PA domain corresponds to the "normal" address domain that the L2 cache 21 is configured to use, and thus maps "one-to-one" to physical addresses in memory 20. The UPA domain, however, is defined to provide a unique mapping between cache lines in the L2 cache 21 that cache data in compressed form, and cache lines at the L1 level that cache data in decompressed form. The encoder 31 and the decoder 33 are then operable to translate between the UPA domain used at the L1 level and the PA domain used at the L2 level. Each cache line at the L1 level also has associated with it an appropriate flag to indicate which address domain applies.

FIG. 6A illustrates this, and shows the L2 cache 21 having an exemplary set of cache lines 500 each tagged with a respective PA address 501 identifying the location in memory 20 where the data in the cache line is stored. FIG. 6A also shows the L1 cache 25 as including a number of corresponding cache lines 550. As shown in FIG. 6A, the tag for each cache line 550 in the L1 cache 25 includes either a PA address or a UPA address 553, and a "tag mode" flag 552 that indicates which of the two address domains the tag relates to (and so whether the data in the cache line is cached in the L2 cache 21 in compressed or uncompressed form).

Each cache line may further include a set of state information (not shown in FIG. 6A), such as flags indicating whether the cache line is valid or not, is dirty or not, is free or not, etc.

FIG. 6A also illustrates how data that is loaded into the L2 cache 21 from the memory 20 can be in either a compressed form or uncompressed form. For example, the first cache line 511 of the L2 cache 21 shown in FIG. 6A is illustrated as including a set of uncompressed data, and the second cache line 512 of the L2 cache 21 shown in FIG. 6A is illustrated as comprising sets of compressed data.

Data that is loaded into the L2 cache 21 in uncompressed form can be simply stored in the L1 cache 25 in uncompressed form. Thus, in the example illustrated in FIG. 6A, the L1 cache 25 includes a corresponding cache line 561 that includes a copy of the set of uncompressed data cached in the first cache line 511 of the L2 cache 21.

Data that is loaded into the L2 cache 21 in compressed form, however, will be decompressed by the decoder 33 before it is stored in the L1 cache 25 in decompressed form. Thus, in the example shown in FIG. 6A, the sets of compressed data in the second cache line 512 of the L2 cache 21 are stored in the L1 cache 25 in a decompressed, and so expanded, form in four corresponding cache lines 562-565. It will be appreciated that the example of FIG. 6A illustrates a 4:1 compression ratio, so that one compressed cache line in the L2 cache 21 corresponds to four UPA cache lines in the L1 cache 25. However, other arrangements would be possible.

A UPA address domain can be defined in any suitable way that provides a unique mapping between cache lines in the L2 cache 21 that cache data in compressed form, and L1 cache lines that cache data in decompressed form.

In the case of an AFBC encoding scheme, for example, a unique mapping between the UPA and PA domains may be provided by defining a UPA address as a concatenation of the physical address of a header data block with an index representing a data element of the data block that the header data block represents:

UPA[47:0]={HeaderPA[39:4], byte_offset_within_block[11:0]}

Here, HeaderPA is the physical address (PA) of the header of a compression block 201, which in this case is a 16 byte aligned address, and byte_offset_within_block is the byte_offset (index) of a sub-block 202 or element (e.g. texel or pixel) within the compression block 201.

FIG. 6B shows a comparison between a PA tag 61 and a UPA tag 62 according to this embodiment. As shown in FIG. 6B, a UPA address comprises a greater number of bits than a PA address to allow for the expansion from a compressed to uncompressed view.

A unique mapping may be provided for an AFRO encoding scheme by defining a UPA address in a similar way. In the case, for example, of a 2:1 compression ratio:

UPA[47:0]={BodyPA[39:12], b'0000000, byte_offset_within_block[12:0]}

And in the case, for example, of a 4:1 compression ratio:

UPA[47:0]={BodyPA[39:12], b'000000, byte_offset_within_block[13:0]}

Here, BodyPA is the address of the physical page, and byte_offset_within_block is the byte offset (index) of a sub-block or data element (e.g. texel or pixel) within the compression block.

An uncompressed virtual address (UVA) can also be defined in a similar way by concatenation of a header virtual address. It will also be appreciated that appropriate addressing logic for other block-based encoding schemes could be defined in a similar way.

As discussed above, in the present embodiments, the graphics processor 10 includes plural caches that can cache the same data (e.g. including one or more Load/Store (L1) caches 25A, 25B, and e.g. one or more texture caches 360). It is thus important to maintain cache coherence. In embodiments of the technology described herein, to accommodate the use of two separate address domains, two separate cache coherency protocols are used, one per address domain.

In particular, in the present embodiment, the L2 cache 21 maintains PA domain directory information 21A that is used to maintain coherency of data that is cached in the L2 cache 21 in uncompressed form. The L2 cache directory 21A thus keeps track of which L1 caches have a copy of each uncompressed cache line the L2 cache 21 is caching. Unique ownership of such a cache line can then be requested from the L2 cache directory 21A before the cache line can be written to.

As shown in FIGS. 3 and 4, the graphics processor 10 of the present embodiment further includes a UPA domain directory 22 that is used to maintain coherency of data that is cached in the L2 cache 21 in compressed form. As shown in FIGS. 3 and 4, the UPA domain directory 22 is provided at the L2 level, e.g. for symmetry with the PA domain directory information 21A maintained by the L2 cache 21.

Figure 7:
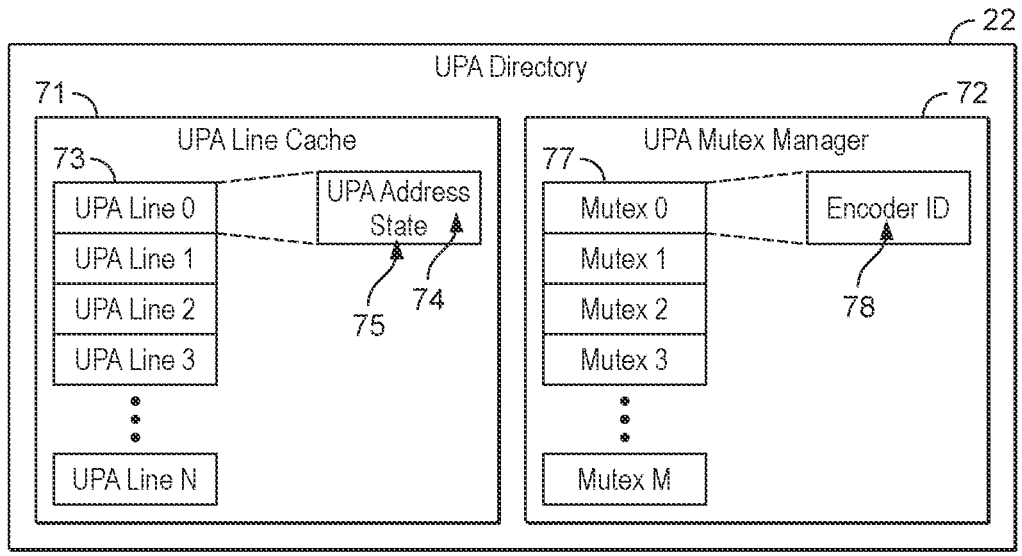
FIG. 7 shows a cache coherence directory in accordance with an embodiment of the technology described herein.

FIG. 7 shows the UPA domain directory 22 in more detail. The UPA domain directory 22 keeps track of, for each decompressed cache line that corresponds to a compressed cache line cached in the L2 cache 21, which L1 caches are caching the respective decompressed cache line.

Thus, as shown in FIG. 7, the UPA domain directory 22 includes a set of entries 71 including an entry 73 for each decompressed cache line that corresponds to a compressed cache line cached in the L2 cache 21. Each entry 73 indicates the respective UPA tag 74, and includes tag state information 75. An L1 cache can then request unique ownership of such a cache line from the UPA domain directory 22 before it can write to that cache line.

As illustrated in FIG. 7, the UPA domain directory 22 is a "dataless" coherence directory, meaning that it does not include copies of the data of the cache lines it is keeping track of. This can avoid the need for storage of a potentially large amount of decompressed (and thus expanded) data that the UPA domain directory 22 is keeping track of.

Figure 8:
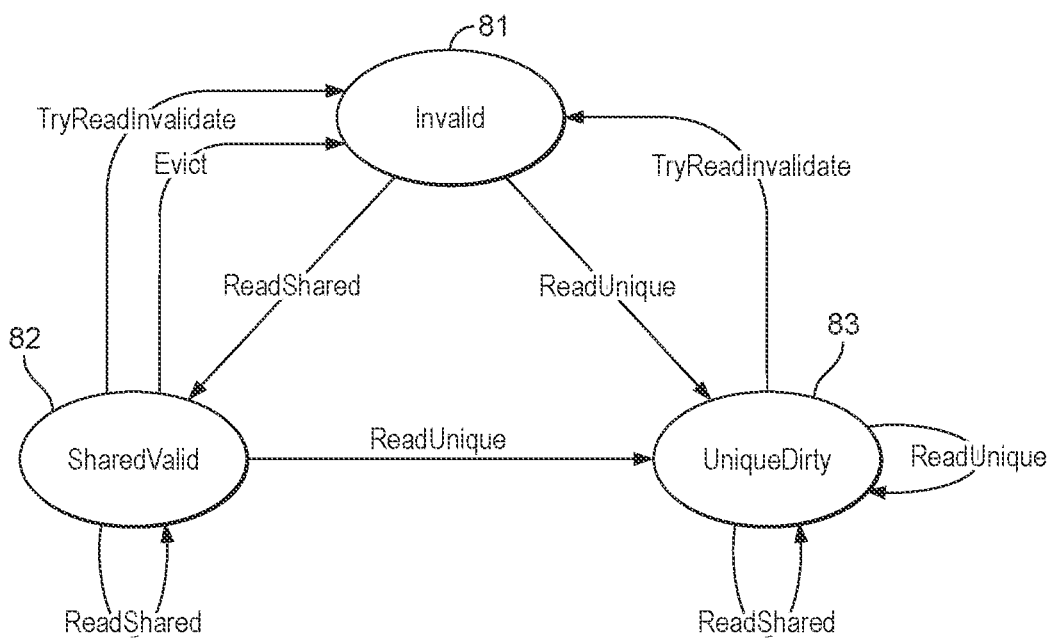
FIG. 8 shows a cache coherence state machine that the cache coherence directory of FIG. 7 may use in accordance with an embodiment of the technology described herein.

FIG. 8 illustrates possible states that the tag state information 75 can indicate, according to the present embodiment. As shown in FIG. 8, in the present embodiment, a cache line can be indicated by the UPA domain directory 22 as being "invalid" 81, "shared and valid" 82, or "unique and dirty" 83.

"Invalid" 81 indicates that data for the cache line is not up to date, and so valid data would need to be fetched from memory 20.

"Shared and valid" 82 indicates that at least one L1 cache is caching an up to date (valid) cache line. In this case, the tag state information 75 further includes a flag for each L1 cache, indicating which L1 caches are caching a valid cache line.

"Unique and dirty" 83 indicates that an L1 cache has unique ownership of a cache line and has updated (or is expected to update) that cache line, but the data in the L2 cache 21 (and memory 20) has not (yet) been updated.

It will be appreciated that other state machines would be possible. For example, it would be possible to indicate a cache line as being "shared and dirty".

As shown in FIG. 7, the UPA domain directory 22 also includes a mutex manager 72 that maintains a set of mutexes including a respective mutex 77 for each compression block 201 that the L2 cache 21 is caching. Each mutex 77 can be assigned to the encoder 31 of only one shader core 24 at any one time, and for these purposes the mutex manager 72 keeps track of the ID 78 of the encoder 31 that a mutex 77 is assigned to. The operation of the mutex manager 72 will be discussed in more detail below.

Figure 9:
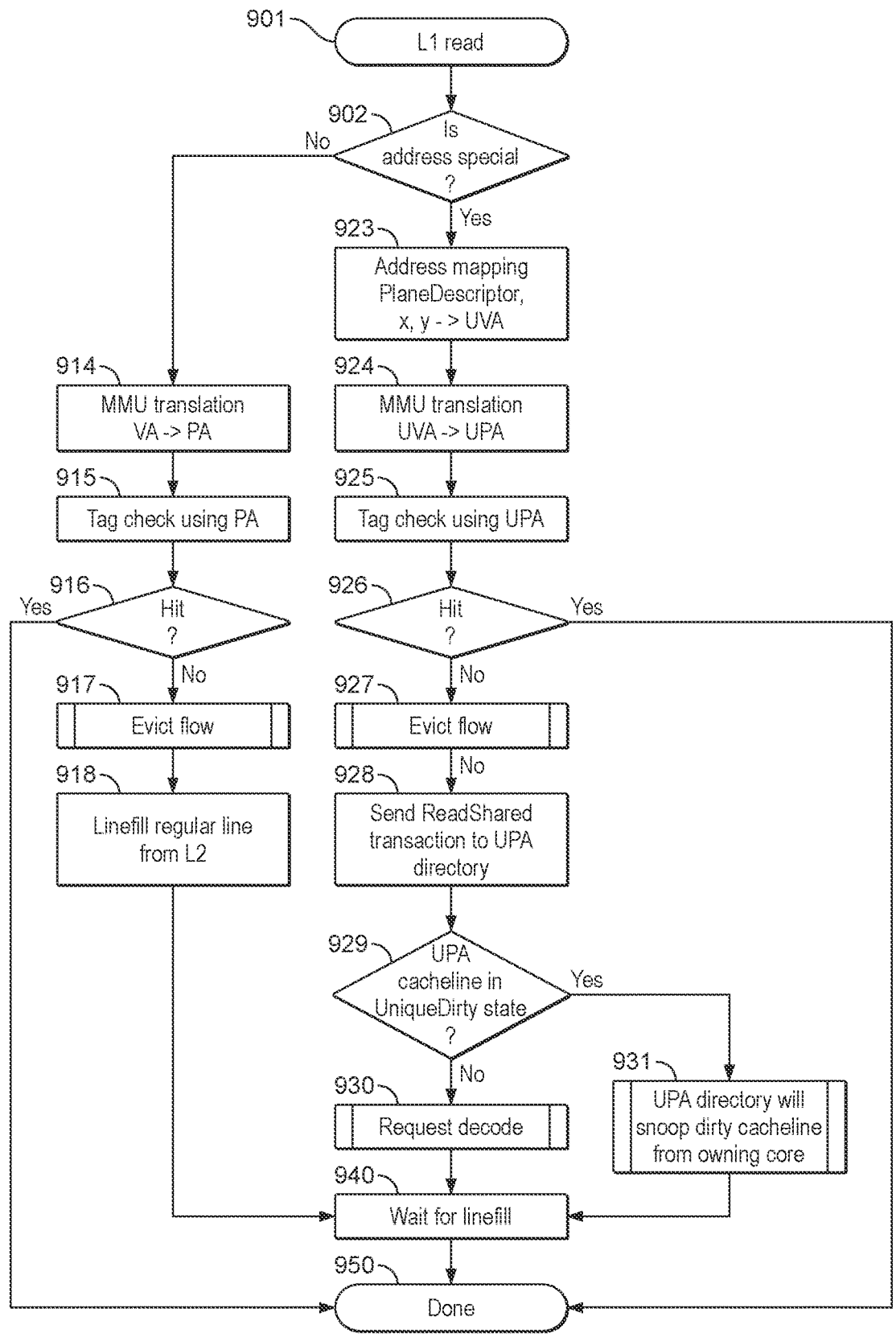
FIG. 9 shows a read process in accordance with an embodiment of the technology described herein.
Figure 10:
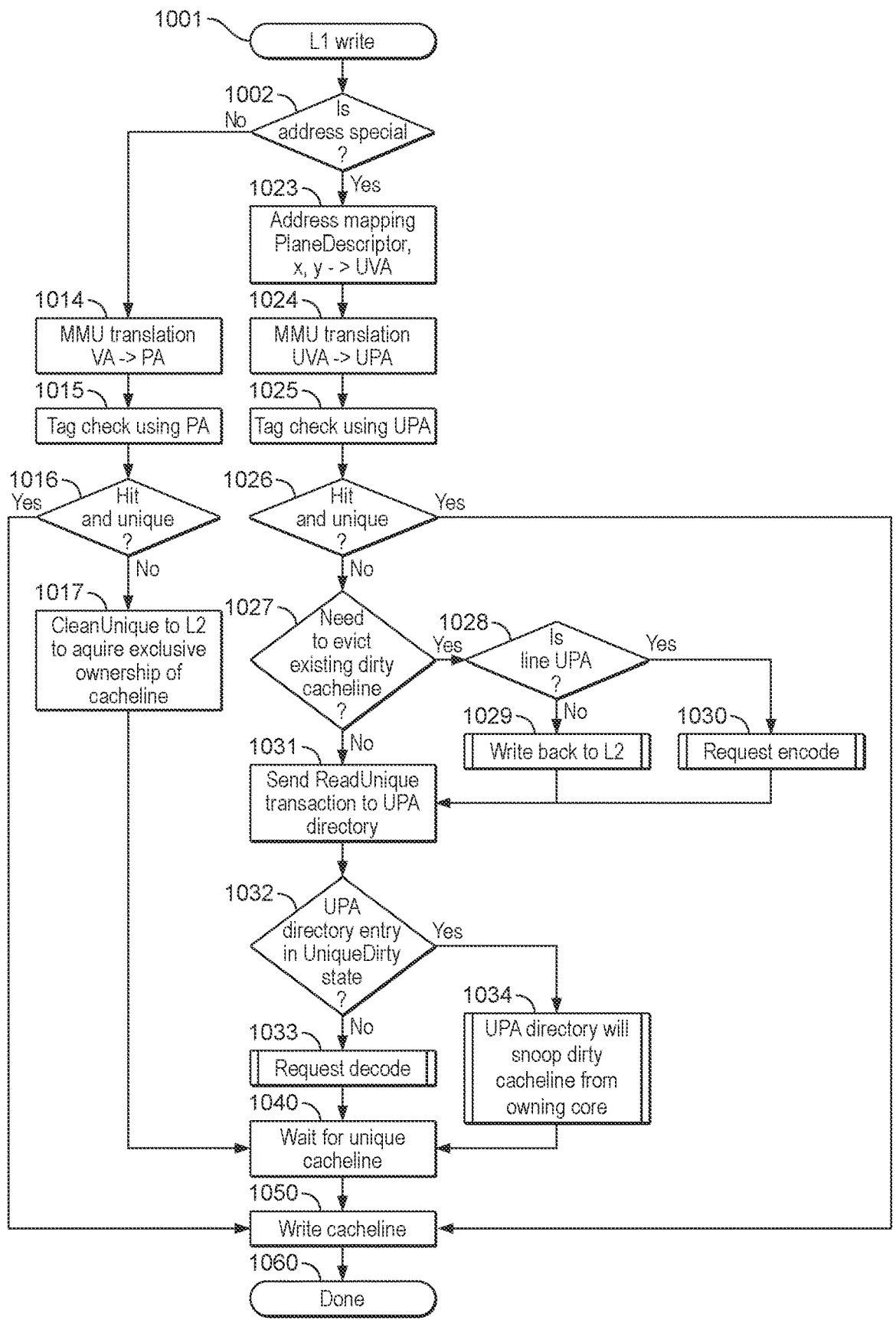
FIG. 10 shows a write process in accordance with an embodiment of the technology described herein.

FIGS. 9 and 10 show how L1 read and write requests are handled according to the present embodiment.

FIG. 9 shows the operation when data is being read from an L1 cache for use by a shader core 24 of the graphics processor 10.

As shown in FIG. 9, when a shader core 24 needs data for a processing operation that it is to perform, it will attempt to read that data from the appropriate L1 cache by issuing a read request 901. The read request 901 will typically be in the form of a request to read a particular coordinate from a particular data array (e.g. texture), and include a virtual address (VA) identifying the data that is required.

If (at step 902) the request 901 relates to an uncompressed data array, then in the present embodiment, it is handled according to steps 914 to 918 as shown in FIG. 9. If, on the other hand, the request 901 relates to a compressed data array (e.g. texture), then in the present embodiment, it is handled according to steps 923 to 931 as shown in FIG. 9.

As shown in FIG. 9, in the case of a request to read an uncompressed data array, the virtual address used in the request is translated from a virtual address (VA) to a physical address (PA) (at step 914), and then the physical address (PA) is used to determine (at step 915) whether a valid cache line containing the requested data is present in the L1 cache 25.

If (at step 916) a valid cache line containing the requested data is present in the L1 cache 25 (i.e. there is "hit" in the L1 cache 25), then the shader core 24 reads the data from the cache line in the L1 cache 25, and the process is complete (at step 950).

If (at step 916), however, a valid cache line containing the requested data is not present in the L1 cache 25 (i.e. there is a read "miss" in the L1 cache 25), then the requested data will need to be fetched into the L1 cache 25.

As shown in FIG. 9, before any data is fetched into the L1 cache 25, it is first determined (at step 917) whether any cache lines need to be evicted from the L1 cache 25. If there is an invalid entry in the L1 cache 25, then its data may be overwritten. Otherwise, an appropriate entry in the L1 cache 25 is evicted to the L2 level.

The required data is then requested (at step 918) from the L2 cache 21 using the determined physical address (PA).

In response to the request, the L2 cache 21 determines whether a valid cache line containing the requested data is present in the L2 cache 21. If it is, the cache line data is provided to L1 cache 25. If not, the appropriate data will be fetched into the L2 cache 21 (from memory 20 or from another L1 cache), and then provided to the L1 cache 25.

Once the required data has been provided to the L1 cache 25 (at step 940), the shader core 24 reads that data from the L1 cache 25, and the process is complete (at step 950).

As shown in FIG. 9, in the case of a request to read a compressed data array, the virtual address used in the request is initially translated from a virtual address (VA) to an uncompressed virtual address (UVA) (at step 923) (by concatenation of a header virtual address, as discussed above). The UVA address is then translated to an uncompressed physical address (UPA) (at step 924), and then the UPA is used to determine (at step 925) whether a valid cache line containing the requested data is present in the L1 cache 25.

If (at step 926) a valid cache line containing the requested data is present in the L1 cache 25 (i.e. there is "hit" in the L1 cache 25), then the shader core 24 reads the data from the cache line in the L1 cache 25, and the process is complete (at step 950).

If (at step 926), however, a valid cache line containing the requested data is not present in the L1 cache 25 (i.e. there is a read "miss" in the L1 cache 25), then the requested data will need to be fetched into the L1 cache 25.

As shown in FIG. 9, before any data is fetched into the L1 cache 25, it is first determined (at step 927) whether any cache lines need to be evicted from the L1 cache 25. If there is an invalid entry in the L1 cache 25, then its data may be overwritten. Otherwise, an appropriate entry (or entries) in the L1 cache 25 is evicted to the L2 level.

Then, the UPA domain directory 22 is notified that the requested data is required (at step 928) using the determined UPA.

In response to the request, the UPA domain directory 22 determines (at step 929) whether there is a "unique and dirty" decompressed cache line for that UPA. If there is, then another L1 cache currently has unique ownership of the decompressed cache line in question.

In this case, the UPA domain directory 22 will cause the decompressed cache line's data to be passed from that other L1 cache to the L1 cache 25 (at step 931). This may involve the decompressed cache line being evicted from the other L1 cache into the L2 cache 21 in decompressed form, and then being provided therefrom to the L1 cache 25. The UPA domain directory 22 will also be updated to indicate that the receiving L1 cache 25 now has unique ownership of the decompressed cache line.

If (at step 929) the UPA domain directory 22 indicates that there is not a corresponding "unique and dirty" decompressed cache, then a decode operation will be required.

If the UPA domain directory 22 indicates that there is a corresponding "shared and valid" decompressed cache line, then decoding of the corresponding compressed cache line cached in the L2 cache 21 will be requested (at step 930), and the decompressed data will be decoded and provided to the L1 cache 25. The UPA domain directory 22 will also be appropriately updated to indicate that the L1 cache 25 now (also) has a valid copy of the decompressed cache line.

Otherwise, the compressed data will be fetched from memory 20 into the L2 cache 21, decoding will be requested (at step 930), the data will be decoded, and the decompressed data provided to the L1 cache 25. In this case, an appropriate new entry (or entries) will be added to the UPA domain directory 22.

Once the required data has been provided to the L1 cache 25 (at step 940), the shader core 24 reads that data from the L1 cache 25, and the process is complete (at step 950).

FIG. 10 shows the operation when data is to be written to the L1 cache 25 by a shader core 24 of the graphics processor 10.

As shown in FIG. 10, when writing data a shader core 24 will issue a write request 1001. The write request 1001 will typically be in the form of a request to write a particular coordinate of a particular data array (e.g. texture), and include a virtual address (VA) identifying the data that is being written.

If (at step 1002) the request 1001 relates to an uncompressed data array (e.g. texture), then in the present embodiment, it is handled according to steps 1014 to 1017 as shown in FIG. 10. If, on the other hand, the request 1001 relates to a compressed data array (e.g. texture), then in the present embodiment, it is handled according to steps 1023 to 1034 as shown in FIG. 10.

As shown in FIG. 10, in the case of a request to write to an uncompressed data array (e.g. texture), the virtual address used in the request is translated from a virtual address (VA) to a physical address (PA) (at step 1014), and then the physical address (PA) is used to determine (at step 1015) whether a unique copy of the cache line to be written to is present in the L1 cache 25.

If (at step 1016) a unique copy of the cache line is present in the L1 cache 25 (there is "hit" in the L1 cache 25 and the cache line state is "unique"), then the shader core 24 writes the data to the cache line in the L1 cache 25 (at step 1050), and the process is complete (at step 1060).

If (at step 1016), however, a unique copy of the cache line to be written to is not present in the L1 cache 25 (the cache line state is not "unique"), then the L1 cache 25 needs to acquire unique ownership of the cache line.

Unique ownership of the cache line is therefore requested (at step 1017), and then when the L1 cache 25 has unique ownership of the cache line in question (at step 1040), the shader core 24 writes the data to the cache line in the L1 cache 25 (at step 1050), and the process is complete (at step 1060).

As shown in FIG. 10, in the case of a request to write to a compressed data array (e.g. texture), the virtual address used in the request is initially translated from a virtual address to an uncompressed virtual address (UVA) (at step 1023). The UVA address is then translated to an uncompressed physical address (UPA) (at step 1024), and then the UPA is used to determine (at step 1025) whether a unique copy of the cache line to be written to is present in the L1 cache 25.

If (at step 1026) a unique copy of the cache line is present in the L1 cache 25 (there is "hit" in the L1 cache 25 and the cache line state is "unique"), then the shader core 24 writes the data to the cache line in the L1 cache 25 (at step 1050), and the process is complete (at step 1060).

If (at step 1026), however, a unique copy of the cache line to be written to is not present in the L1 cache 25 (the cache line state is not "unique"), then the L1 cache 25 needs to acquire unique ownership of the cache line.

As shown in FIG. 10, in this case it is first determined (at step 1027) whether an existing "dirty" entry (cache line) needs to be evicted. If so, it is determined (at step 1028) whether the tag mode flag 552 for the dirty entry indicates a UPA or PA domain. If the flag 552 indicates the PA domain, then the dirty entry to be evicted is written back to the L2 cache 21 in uncompressed form (at step 1029). If, however, the flag 552 indicates the UPA domain, then the dirty entry to be evicted is first encoded and then written back to the L2 cache 21 in compressed form (at step 1030).

Then, the UPA domain directory 22 is notified that unique ownership of the cache line to be written is required (at step 1031) using the determined UPA.

In response to the request, the UPA domain directory 22 determines whether the cache system is caching a valid copy of the cache line to be written to that is in the "unique and dirty" state (step 1032).

If the cache system is already caching a valid copy of the cache line to be written to, and the state of the cache line to be written to is indicated by the UPA domain directory 22 as being "unique and dirty", that indicates that another L1 cache currently has unique ownership of the cache line in question.

In this case, the UPA domain directory 22 will cause the cache line in question to be transferred from that other L1 cache to the L1 cache 25 (at step 1034). This may involve the decompressed cache line being evicted from the other L1 cache into the L2 cache in decompressed form, and then being provided therefrom to the L1 cache 25. The sending L1 cache and UPA domain directory 22 will also be updated to indicate that the receiving L1 cache 25 now has unique ownership.

If (at step 1032) the cache line to be written to is not indicated by the UPA domain directory 22 as being "unique and dirty", i.e. if it is indicated by the UPA domain directory 22 as being "shared and valid", then a decode operation will be required.

Thus, in this case, decoding of the corresponding compressed cache line cached in the L2 cache 21 is requested (at step 1033), the data is decoded, and the decompressed data is provided to the L1 cache 25. The UPA domain directory 22 will also be appropriately updated to indicate that the L1 cache 25 now has unique ownership of the cache line ("unique and dirty"), and corresponding entries in other L1 caches will be updated to indicate invalid entries.

Then, when the L1 cache 25 has unique ownership of the cache line to be written to (at step 1040), the shader core 24 writes the data to the cache line in the L1 cache 25 (at step 1050), and the process is complete (at step 1060).

As discussed above, the Applicants have recognised that for data that is cached in the L2 cache 21 in uncompressed form, each L1 cache line will correspond to a respective single "parent" L2 cache line, whereas in the case of data that is cached in the L2 cache 21 in compressed form, plural L1 cache lines will typically correspond to the same "parent" L2 cache line.

FIG. 6A illustrates this, and shows an example in which the L2 cache 21 includes a first cache line 511 that caches uncompressed header data for a compression block 201, and a second cache line 512 that caches corresponding compressed payload data for the compression block 201. FIG. 6A also shows the L1 cache 25 as including a number of corresponding cache lines, including a copy of the first, uncompressed header cache line 561, and four cache lines 562-565 that cache the compressed payload data for the compression block 201 in decompressed form.

Thus, in this example, the single uncompressed L1 header cache line 561 corresponds to (only) a single L2 cache line 511, whereas the four decompressed L1 cache lines 562-565 correspond to the same single compressed L2 cache line 512.

In this example, where data corresponding to one of the decompressed L1 cache lines 562-565 has been updated, eviction of one of the decompressed L1 cache lines 562-565 from the Load/Store (L1) cache 25 to the L2 cache 21 will involve compressing the data corresponding to all four decompressed L1 cache lines 562-565 to generate updated compressed payload data and updated header data for the compression block 201, writing the updated compressed payload data to the corresponding L2 cache line 512, and writing the updated header data to the corresponding L2 cache line 511.

Thus, the eviction of a single L1 cache line from the Load/Store (L1) cache 25 can involve updating one or more cache lines in the L2 cache 21 that correspond to a greater number of L1 cache lines.

To facilitate cache coherence in this situation, in the present embodiment, the eviction of an L1 cache line from the Load/Store (L1) cache 25 that caches data for a compression block 201 can trigger the invalidation of all (e.g. header and payload) cache lines in the Load/Store (L1) cache 25 and texture mapper cache 360 that cache data for the same compression block 201. For example, in the FIG. 6A example, eviction of one of cache lines 562-565 from the Load/Store (L1) cache 25 triggers invalidation of any corresponding header or payload cache lines in the texture mapper cache 360.

Figure 11:
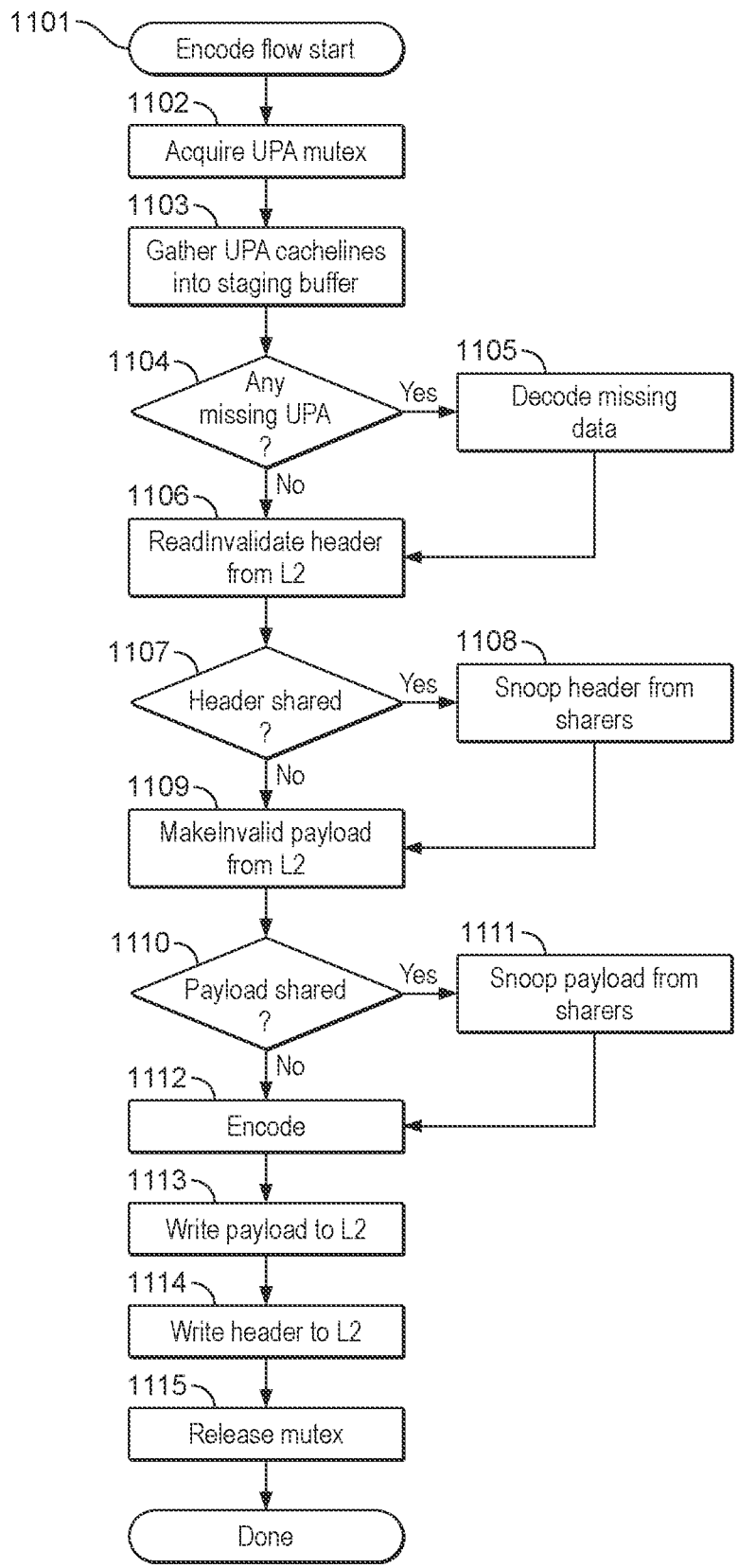
FIG. 11 shows an evict process in accordance with an embodiment of the technology described herein.

FIG. 11 shows the operation when a decompressed cache line is to be evicted from the L1 cache 25 of a shader core 24 and stored in the L2 cache 21 in compressed form, according to the present embodiment.

As shown in FIG. 11, when a cache line is to be evicted to the L2 cache 21 and stored in compressed form, a request for encoding will be issued to the encoder 31 (at step 1101).

In response to the request, the encoder 31 will request the mutex 77 from the UPA domain directory 22 that corresponds to the compression block 201 that is to be encoded using the UPA of the cache line being evicted. Once the encoder 31 has acquired the mutex for the compression block 201 (at step 1102), the encoder will then attempt to gather all of the other decompressed cache lines corresponding to the compression block 201 into its staging buffer 32 (at step 1103).

In the present embodiment, to do this, the encoder 31 will first attempt to locate valid decompressed cache lines corresponding to the compression block 201 in its local L1 cache 25 by issuing UPA read requests to the local L1 cache 25.

If, after attempting to locate valid decompressed cache lines in the local L1 cache 25, there remain missing cache lines corresponding to the compression block 201, the encoder 31 will then look for any dirty cache lines corresponding to the compression block 201 in other L1 caches of the graphics processor 10. To do this, the encoder 31 issues UPA read requests to the UPA domain directory 22, in response to which the UPA domain directory 22 will cause any dirty cache lines corresponding to the compression block 201 in other L1 caches to be passed to the staging buffer 32 of the encoder (via the L2 cache 21).

If (at step 1104), after attempting to locate cache lines in the local and other L1 caches, there remain missing cache lines corresponding to the compression block 201, then the missing cache lines are provided by decoding the compressed compression block 201 stored in the L2 cache 21. Thus, as shown in FIG. 11, in this case, the encoder 31 requests a decode of the compression block 201 (at step 1105), the compression block 201 is decoded, and the missing decompressed cache lines are passed to the staging buffer 32 of the encoder 31.

Then, once all of the decompressed cache lines corresponding to the compression block 201 have been gathered in the staging buffer 32 of the encoder 31, the encoder 31 reads and invalidates (at step 1106) the cache line in the L2 cache 21 containing the header for the compression block 201. If (at step 1107) a header cache line is shared at the L1 level (e.g. in the texture mapper cache 360), then the L1 level header cache line(s) is also invalidated (at step 1108).

Then, payload cache lines at the L2 level corresponding to the compression block 201 are invalidated (at step 1109). If (at step 1110) a payload cache line is shared at the L1 level (e.g. in the texture mapper cache 360), then the L1 level payload cache lines are also invalidated (at step 1111).

Then, once all of the L2 and L1 level cache lines corresponding to the compression block have been invalidated, the encoder 32 encodes the cache lines gathered in the staging buffer 32 (at step 1112), writes new payload cache lines to the L2 cache 21 (at step 1113), writes a new header cache line to the L2 cache 21 (at step 1114), and then releases the mutex 77 (at step 1115).

Invalidating all L1 level cache lines corresponding to the compression block 201 before updating the compression block data at the L2 level can facilitate cache coherence, since any subsequent access to the compression block data at the L1 level (e.g. by the texture mapper cache 360) will involve the updated compression block data needing to be fetched from the L2 level (and decompressed).

Moreover, invaliding header cache lines before payload cache lines, and updating header cache lines after payload cache lines, can facilitate cache coherence since a header cache line will only ever be valid after the corresponding payload cache lines have been appropriately updated.

The Applicants have recognised that although the eviction process described above with reference to FIG. 11 can facilitate cache coherence, it may involve a relatively large number of coherency transactions passing between the L1 and L2 levels. For example, invalidating L2 payload cache lines (at step 1109) and invalidating L1 payload cache lines (at step 1111) may involve a transaction passing between the L1 and L2 levels for each payload cache line in question. The Applicants have recognised that it is possible to reduce such coherency traffic by exploiting the link between header and payload cache lines, whereby header data must typically first be accessed in order to then access associated payload data.

In particular, in embodiments of the technology described herein, information can be maintained by an L1 level cache (e.g. Load/Store (L1) cache 25A, 25B, and/or texture cache 360) that indicates any links between header cache lines and associated payload cache lines within the cache. The maintained "link information" can then be used, for example, to trigger invalidation of all associated payload cache lines in an L1 level cache when the cache receives a request to invalidate a header cache line (e.g. at step 1108 in FIG. 11). Payload cache lines can thereby be invalidated without the need for additional coherency transactions passing between the L1 and L2 levels. For example, steps 1109-1111 shown in FIG. 11 may be effectively omitted.

Figure 12:
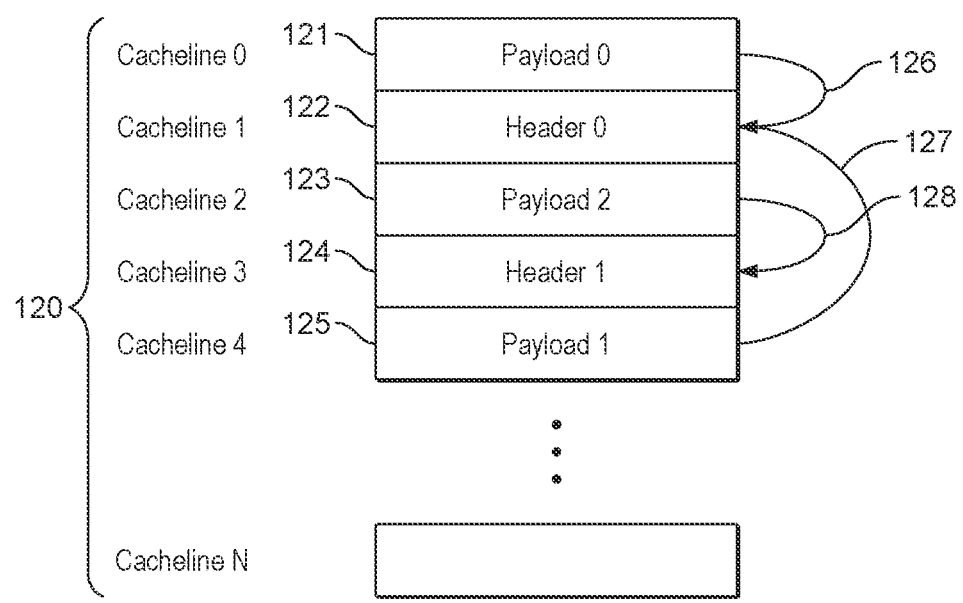
FIG. 12 illustrated linked cache lines in accordance with an embodiment of the technology described herein.

FIG. 12 illustrates link information maintained by an L1 level cache (e.g. Load/Store (L1) cache 25A, 25B, texture cache 360) according to the present embodiment. FIG. 12 shows an example L1 cache as including a number of cache lines 120, including two payload cache lines 121, 125 that are associated with header cache line 122, and one payload cache line 123 that is associated with another header cache line 124. As illustrated in FIG. 12, in this embodiment each payload cache line includes link information in the form of a pointer 126-128 pointing to the associated header cache line.

Figure 13:
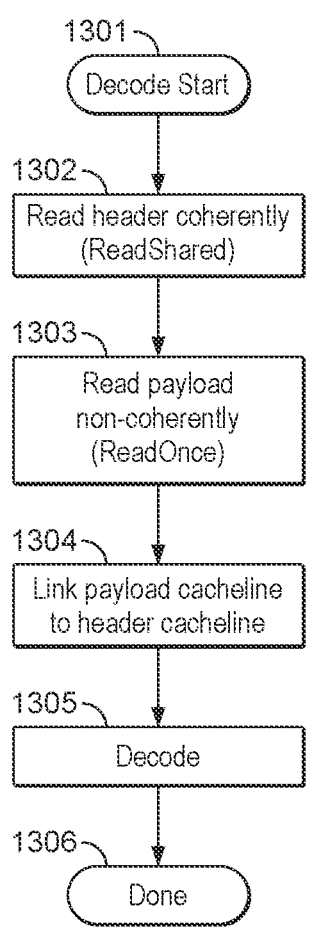
FIG. 13 shows a read process in accordance with an embodiment of the technology described herein.

FIG. 13 illustrates the operation when compressed cache line data is to be fetched from the L2 cache 21 into an L1 level cache (e.g. Load/Store (L1) cache 25A, 25B, and/or texture cache 360), according to the present embodiment.

As shown in FIG. 13, when compressed cache line data is to be fetched into an L1 cache, the L1 cache will issue a request for decoding to the decoder 33 (at step 1301). The request may include a requested UPA address.

In response to the request, the decoder 33 will translate the UPA address to a PA address of the header for the compression block 201 to be decoded, and then issue a PA read request to the L2 cache 21 in order to read the header into the decoder cache 34 (at step 1302). As shown in FIG. 13, the request to read the header is in the form of a "ReadShared" request, which triggers the L2 cache 21 to provide the requested header cache line, and causes the header cache line to be marked as shared in the L2 cache directory 21A.

The decoder 33 will then use the read header information to determine PA information for payload cache lines for the compression block 201 to be decoded, and issue appropriate PA read requests to the L2 cache 21 in order to fetch the payload data into the decoder cache 34 (at step 1303).

These payload read requests could be in the form of "ReadShared" requests, and thus cause read payload cache lines to be marked as shared in the L2 cache directory 21A. However, in the present embodiment, as shown in FIG. 13, requests to read payload data are in the form of a "ReadOnce" request, which triggers the L2 cache 21 to provide a requested payload cache line, but without causing the payload cache line to be marked as shared in the L2 cache directory 21A. This can then avoid coherency traffic which could otherwise be triggered were the payload cache lines to be marked as shared in the L2 cache directory 21A.

As shown in FIG. 13, rather than marking a payload cache line as being shared at the L2 level, link information indicating the header cache line that the payload cache line is associated with is added to the payload cache line at the L1 level (at step 1304).

Once the header cache line and all of the associated payload cache lines have been read in into the decoder cache 34, and linked, the decoder 33 decompresses the compressed payload data, and provides the required decompressed cache line and link information to the requesting L1 cache.

Figure 14:
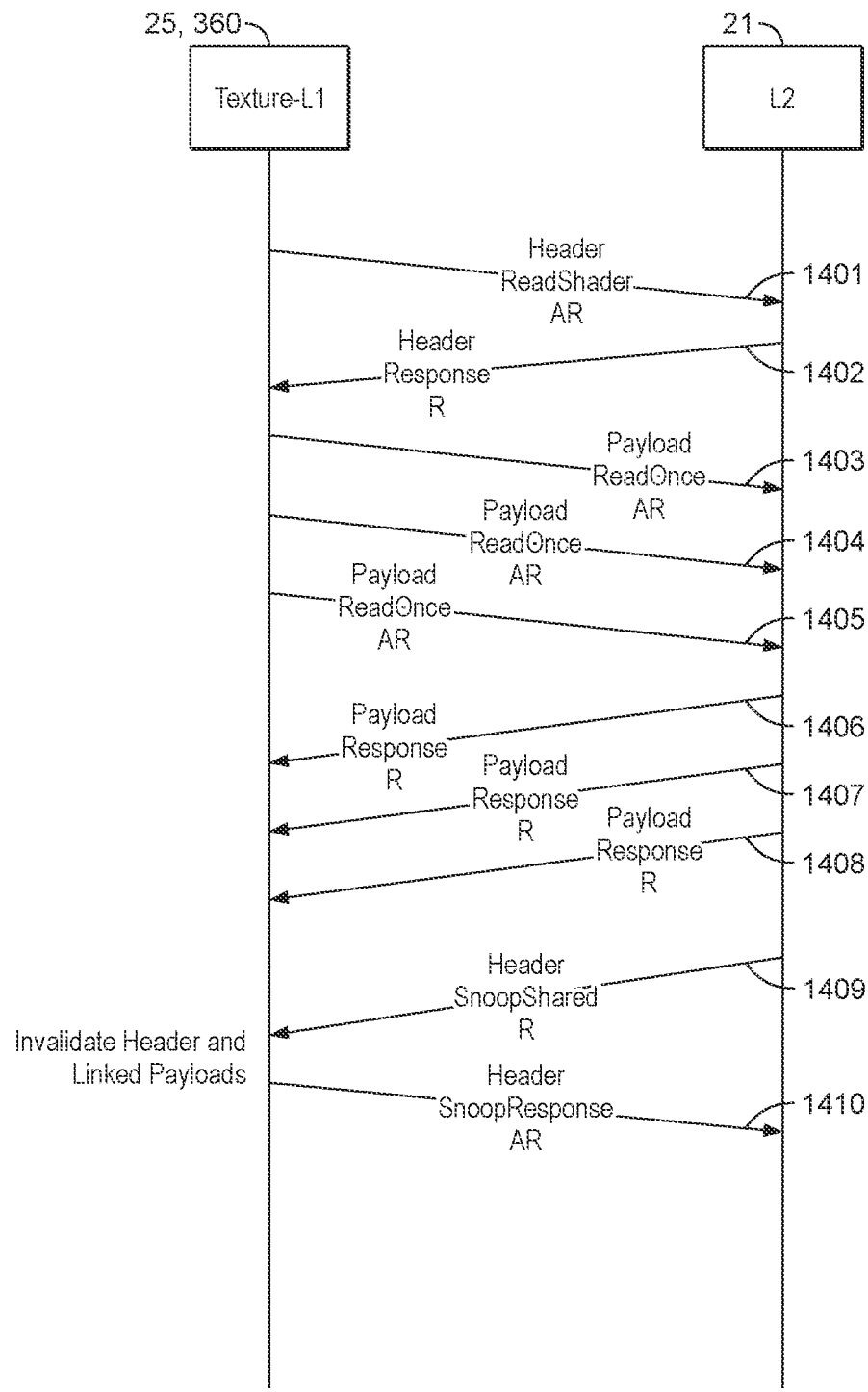
FIG. 14 shows a read and invalidation process in accordance with an embodiment of the technology described herein.

FIG. 14 shows an example sequence of coherency transactions according to the present embodiment. As shown in FIG. 14, in response to a request 1401 from an L1 level cache (e.g. Load/Store (L1) cache 25A, 25B, texture cache 360) to read a header cache line, the L2 cache 21 responds 1402 with the requested header data. As shown in FIG. 14, the request to read the header is in the form of a "ReadShared" request, and so causes the header cache line to be marked as shared in the L2 cache directory 21A.

The read header information is then used to generate requests 1403-1405 to read in payload cache lines associated with the header, and the L2 cache 21 responds 1406-1408 with the requested payload data. As shown in FIG. 14, a request to read payload data is in the form of a "ReadOnce" request, which does not cause the payload cache line to be marked as shared in the L2 cache directory 21A. Instead, a pointer to the associated header cache line is included in each L1 payload cache line.

As shown in FIG. 14, a single request 1409 from the L2 level to invalidate an L1 level header cache line can then trigger invalidation of the header cache line and all of the linked payload cache lines, e.g. rather than requiring multiple requests from the L2 level. Similarly, a single 1410 response can indicate that a header cache line and all linked payload cache lines have been invalidated, e.g. rather than multiple responses.

Figure 15:
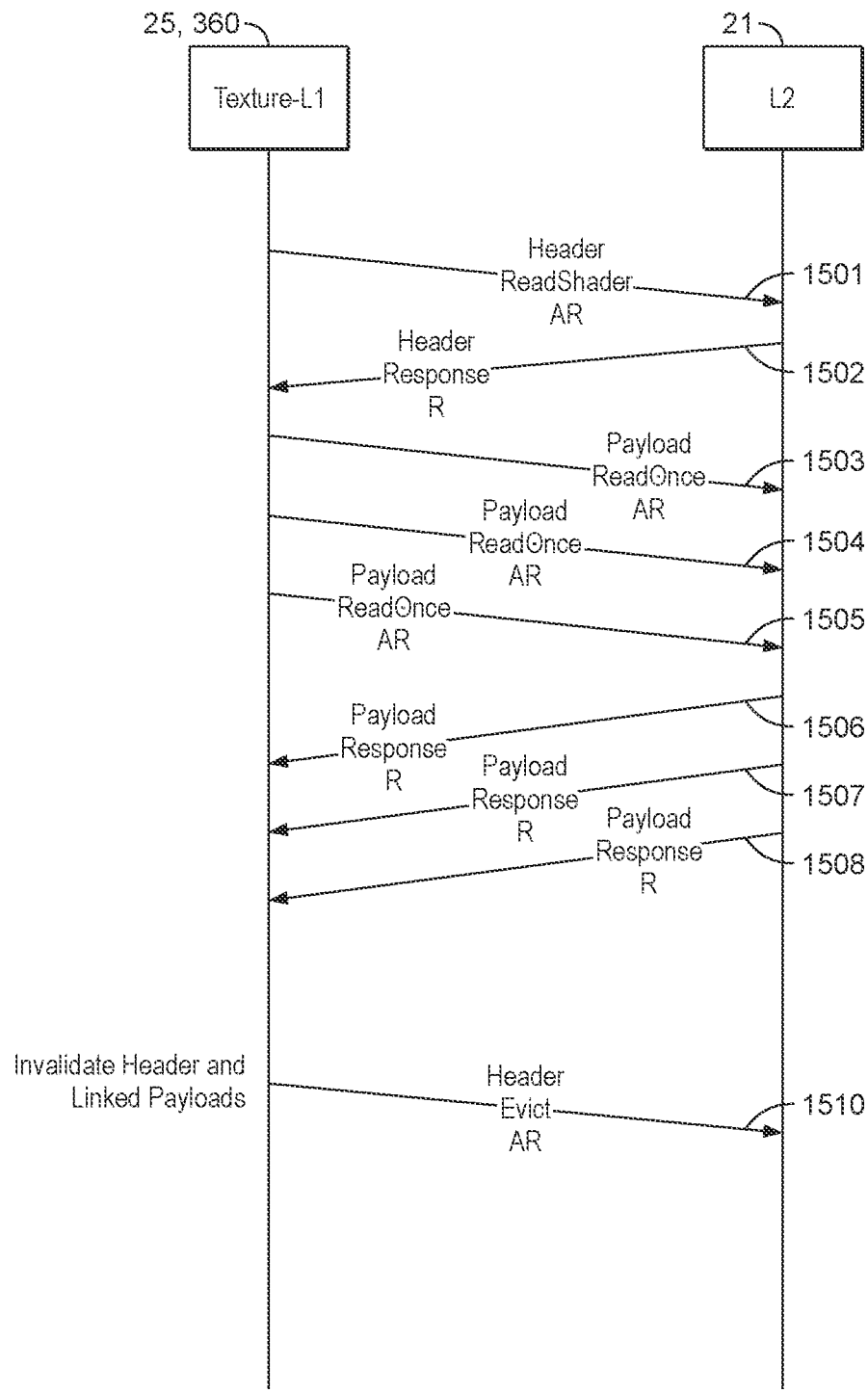
FIG. 15 shows a read and eviction process in accordance with an embodiment of the technology described herein.

FIG. 15 shows another example sequence of coherency transactions according to the present embodiment. As shown in FIG. 15, in response to a request 1501 from an L1 level cache (e.g. Load/Store (L1) cache 25A, 25B, texture cache 360) to read a header cache line, the L2 cache 21 responds 1502 with the requested header data. As shown in FIG. 15, the request to read the header is in the form of a "ReadShared" request, and so causes the header cache line to be marked as shared in the L2 cache directory 21A.

The read header information is then used to generate requests 1503-1505 to read in payload cache lines associated with the header, and the L2 cache 21 responds 1506-1508 with the requested payload data. As shown in FIG. 15, a request to read payload data is in the form of a "ReadOnce" request, which does not cause the payload cache line to be marked as shared in the L2 cache directory 21A. Instead, a pointer (i.e. link information) to the associated header cache line is included in each L1 payload cache line.

As discussed above, eviction of a header cache line from the L1 level to the L2 level will effectively involve eviction of all associated payload cache lines. Thus, as shown in FIG. 15, when the header cache line is subsequently evicted 1510 to the L2 cache 21 and invalidated at the L1 level, the link information is used to trigger invalidation of all linked payload cache lines at the L1 level.

In these embodiments, invalidation of a header cache line could trigger immediate invalidation of linked payload cache lines. However, in some situations, such as where a payload cache line is locked, this may not be possible. To account for this, in the present embodiment, when a header cache line is invalidated, linked payload cache lines are marked as "deferred invalidate", and the cache system will then attempt to invalidate a "deferred invalidate" payload cache line as soon as possible, e.g. once the lock is released. The cache system is configured such that a cache line that is marked as "deferred invalidate" cannot return a cache "hit".

The above describes certain features of the operation of the graphics processor 10 of FIGS. 3, 4 and 5. Further features of the operation of the graphics processor 10 in accordance with embodiments of the technology described herein will now be described.

As discussed above, in embodiments of the technology described herein, eviction of dirty data from the L1 cache 25 to the L2 cache 21 involves gathering all cache lines corresponding to the same compression block into the staging buffer 32 of the encoder 31, and the encoder 31 then encoding the gathered cache lines, and writing the resulting compression block to the L2 cache 21. The Applicants have recognised that this process can consume significant processing resources. Furthermore, it can be the case that encoding operations are triggered for a compression block before processing for the compression block has completed, such that encoding operations are performed that are effectively redundant.

Figure 16:
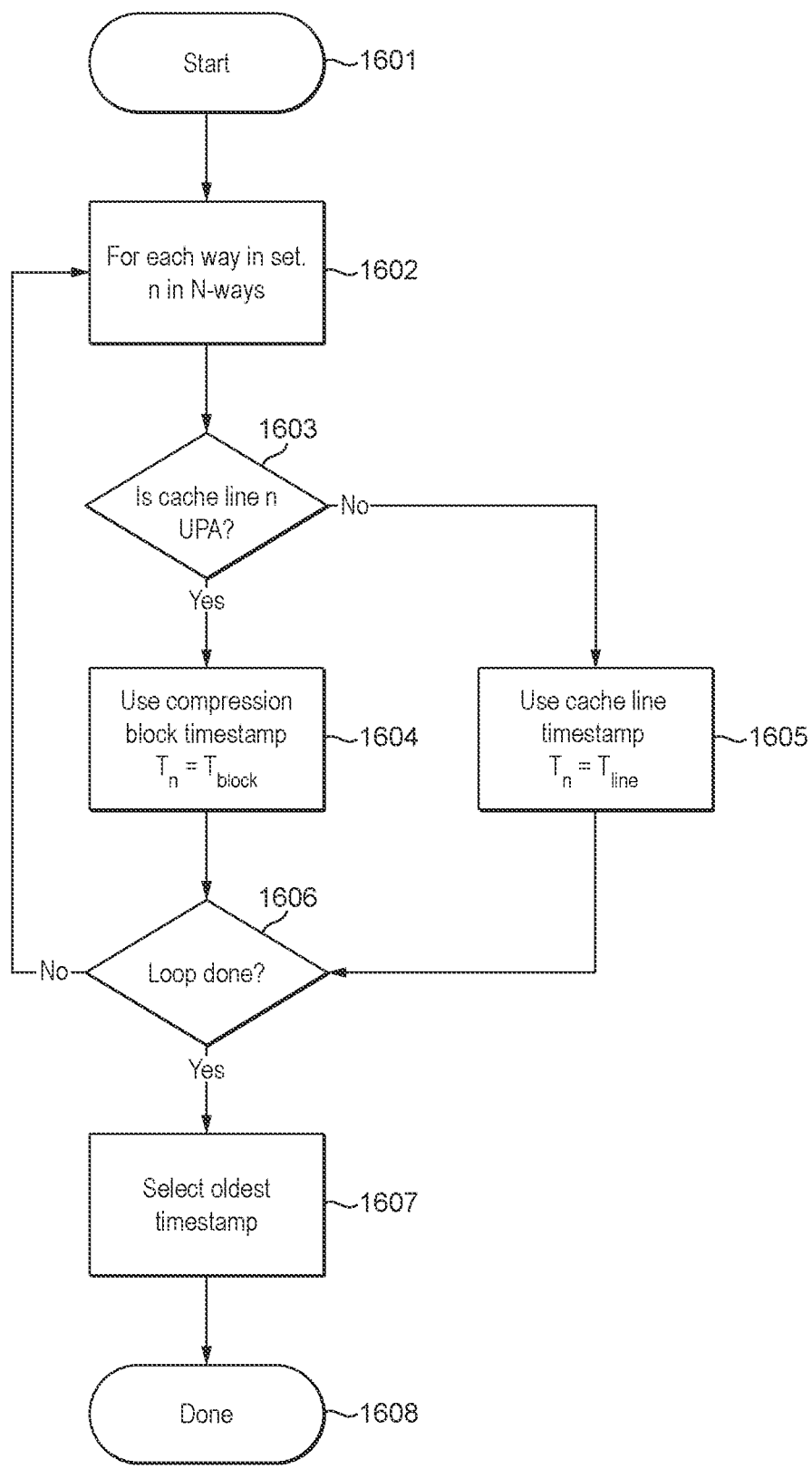
FIG. 16 shows a process to select a cache entry to evict in accordance with an embodiment of the technology described herein.

FIG. 16 illustrates a process for selecting which cache entry to evict from the L1 cache 25, e.g. in order to make space for new data, in accordance with embodiments of the technology described herein. As shown in FIG. 16, when an eviction operation is triggered (step 1601), each cache line in a set of cache lines is considered for eviction (step 1602), and the cache line that is associated with the oldest timestamp in the set is selected (step 1607), and evicted to the L2 cache 21 (step 1608). Thus, the process of FIG. 16 shares similarities with a typical e.g. least recently used (LRU) cache eviction policy.

However, in contrast with a typical e.g. LRU cache eviction process, in the process of FIG. 16, a determination is made (at step 1603) as to whether a cache line in the L1 cache 25 is tagged using a PA address or a UPA address. If a cache line is tagged using a PA address then the timestamp that is considered for that cache line is the timestamp of the cache line itself (step 1605). If, however, a cache line is tagged using a UPA address, then the timestamp that is considered for that cache line is a timestamp associated with the compression block that the cache line is caching data for (step 1604).

In the present embodiment, the superblock cache (SBC) 41 maintains, for each of its entries, a timestamp indicating when that entry was allocated, and the timestamp that is considered for a UPA cache line is the corresponding timestamp maintained by the superblock cache (SBC) 41. Thus, in the present embodiment, a compression block timestamp indicates an age of a compression block that corresponds to when a cache line for the compression block was first allocated in the L1 cache 25. Other indications of compression block age would be possible.

Taking compression block age into account in this manner results in cache lines that cache data for relatively older compression blocks being preferentially selected for eviction, even where individual cache lines associated with a compression block have been relatively recently used. This means that cache lines that cache data for compression blocks for which processing has been completed are more likely to be selected for eviction. This can reduce the likelihood of an encoding operation being triggered for a compression block before processing for the compression block has completed, and thus reduce the number of effectively redundant encoding operations performed per compression block. This can accordingly save processing requirements.

It will be appreciated from the above that the technology described herein, in its embodiments at least, provides arrangements in which the number of eviction triggered encoding operations can be reduced. This is achieved, in the embodiments of the technology described herein at least, by taking compression block timestamps into account when selecting a cache line for eviction.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A cache system operable to cache data stored in memory for a processor, the cache system comprising:
   a cache operable to cache data that is stored in the memory in uncompressed form, and to cache in decompressed form data for compression blocks that is stored in the memory in compressed form; and
   an eviction circuit configured to, when it is desired to evict a cache entry from the cache:
   select the cache entry to evict from the cache by:
     determining age indicating information for each cache entry that could be evicted from the cache; and
     selecting the cache entry to evict using the determined age indicating information;
   wherein
     for each cache entry that caches in decompressed form data for a compression block that is stored in the memory in compressed form, the age indicating information indicates an age of the compression block that the respective cache entry caches data for; and
     wherein for each cache entry that caches data that is stored in the memory in uncompressed form, the age indicating information indicates an age of the respective cache entry; and
   evict the selected cache entry from the cache.

2. The cache system of claim 1, wherein the eviction circuit is configured to determine the age indicating information by reading a timestamp.

3. The cache system of claim 1, wherein:
   the cache system comprises a compression block cache; and
   the eviction circuit is configured to determine the age indicating information by determining when an entry of the compression block cache was allocated.

4. The cache system of claim 1, wherein the eviction circuit is configured to select the cache entry to evict from the cache using the determined age indicating information by selecting the cache entry that corresponds to an oldest age.

5. The cache system of claim 1, wherein:
   the cache system is operable to identify entries of the cache that cache data that is stored in the memory in uncompressed form using a first address domain, and to identify entries of the cache that cache data that is stored in the memory in compressed form using a different, second address domain; and
   the eviction circuit is configured to determine whether the cache entry of the cache caches data that is stored in the memory in uncompressed form or data that is stored in the memory in compressed form based on whether the cache entry is identified using the first address domain or the second address domain.

6. The cache system of claim 1, wherein the processor is a graphics processing unit.

7. A method of operating a cache system that is operable to cache data stored in memory for a processor;
   wherein the cache system comprises a cache operable to cache data that is stored in the memory in uncompressed form, and to cache in decompressed form data for compression blocks that is stored in the memory in compressed form;
   the method comprising, when it is desired to evict a cache entry from the cache:
   selecting the cache entry to evict from the cache by:
     determining age indicating information for each cache entry that could be evicted from the cache; and
     selecting the cache entry to evict using the determined age indicating information;
   wherein
     for each cache entry that caches in decompressed form data for a compression block that is stored in the memory in compressed form, the age indicating information indicates an age of the compression block that the respective cache entry caches data for; and wherein for each cache entry that caches data that is stored in the memory in uncompressed form, the age indicating information indicates an age of the respective cache entry; and evicting the selected cache entry from the cache.

8. The method of claim 7, comprising determining the age indicating information by reading a timestamp.

9. The method of claim 7, wherein the cache system comprises a compression block cache; and the method comprises:

determining the age indicating information by determining when an entry of the compression block cache was allocated.

10. The method of claim 7, comprising selecting the cache entry to evict from the cache using the determined age indicating information by selecting the cache entry that corresponds to an oldest age.

11. The method of claim 7, wherein:

the cache system is operable to identify entries of the cache that cache data that is stored in the memory in uncompressed form using a first address domain, and to identify entries of the cache that cache data that is stored in the memory in compressed form using a different, second address domain; and the method comprises:

determining whether the cache entry of the cache caches data that is stored in the memory in uncompressed form or data that is stored in the memory in compressed form based on whether the cache entry is identified using the first address domain or the second address domain.

12. The method of claim 7, wherein the processor is a graphics processing unit.

13. A non-transitory computer readable storage medium storing software code which when executing on a processor performs a method of operating a cache system that is operable to cache data stored in memory for a processor;

wherein the cache system comprises a cache operable to cache data that is stored in the memory in uncompressed form, and to cache in decompressed form data for compression blocks that is stored in the memory in compressed form;

the method comprising, when it is desired to evict a cache entry from the cache:

selecting the cache entry to evict from the cache by:

determining age indicating information for each cache entry that could be evicted from the cache; and selecting the cache entry to evict using the determined age indicating information;

wherein for each cache entry that caches in decompressed form data for a compression block that is stored in the memory in compressed form, the age indicating information indicates an age of the compression block that the respective cache entry caches data for; and wherein for each cache entry that caches data that is stored in the memory in uncompressed form, the age indicating information indicates an age of the respective cache entry; and evicting the selected cache entry from the cache.

* * * * *